US006460768B2

(12) United States Patent
Ring et al.

(10) Patent No.: US 6,460,768 B2
(45) Date of Patent: Oct. 8, 2002

(54) ULTRA-COMPACT BAR-CODE SCANNER

(75) Inventors: James W. Ring, Blodgett, OR (US); David L. Bolen, Clive, IA (US); Craig H. Bontly, Eugene, OR (US); Nicholas J. Tsacoumangos, Mission Viejo, CA (US); Michael J. Ahten, Eugene, OR (US); Jorge L. Acosta, Eugene, OR (US); Thomas E. Tamburrini, Eugene, OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 09/825,150

(22) Filed: Apr. 3, 2001

(65) Prior Publication Data

US 2001/0032884 A1 Oct. 25, 2001

Related U.S. Application Data

(60) Continuation of application No. 09/470,320, filed on Dec. 21, 1999, now Pat. No. 6,244,510, which is a continuation of application No. 08/325,967, filed on Oct. 20, 1994, now Pat. No. 6,065,676, which is a division of application No. 07/870,689, filed on Apr. 17, 1992, now abandoned.

(51) Int. Cl.⁷ .................................................. G06K 7/10

(52) U.S. Cl. .............................. 235/462.43; 235/472.01

(58) Field of Search ........................ 235/462.3, 472.01

(56) References Cited

U.S. PATENT DOCUMENTS

| 1,853,282 A | 4/1932 | O'Neill |
| 2,716,698 A | 8/1955 | Brukner |
| 2,997,591 A | 8/1961 | Guentner et al. |

(List continued on next page.)

FOREIGN PATENT DOCUMENTS

JP 60-83462 * 3/1994

OTHER PUBLICATIONS

Omniscan OS–510 product brochure (Dec. 1990).
Metrologic MS700 product brochure (Jan. 1991).
New Scanner Reads from Afar, *Dayton Daily News*, Jan. 14, 1992.

Primary Examiner—Harold I. Pitts
(74) Attorney, Agent, or Firm—Lyon & Lyon LLP

(57) ABSTRACT

An improved, rotatably articuable scanner for reading and decoding bar codes in connection with the sale of retail articles is disclosed. An ultra-compact, lightweight, low-cost, self-contained, visible laser diode (VLD) bar code scanner is provided with a great range of functionality and versatility. A scan head housing an optical subsystem is rotatably connected with a tower housing. The heat-generating electronic components are located in the tower housing away from heat-sensitive optical components located in the scan head. The scanner presents an extremely small footprint, and provides for its mounting in virtually any orientation and location.

The optical subsystem uses a basket-type mirror array configured around a rotating planar folding mirror, driven by a compact cup (brushed) DC motor. The scanner features a short optical beam path. The organization of components within the scan head and tower housings, as well as the partitioning thereof between the two, provides for convection-cooled operation of the optical subsystem. The center of mass of components in the scan head is located near an axis of rotation of the scan head, thereby making the scanner extremely stable despite its small footprint. Ease of field maintenance and calibration of the optical subsystem is very simple because the replaceable components thereof are decoupled from the remaining components and replacement parts do not require optical alignment.

19 Claims, 15 Drawing Sheets

U.S. PATENT DOCUMENTS

| | | |
|---|---|---|
| 3,796,878 A | 3/1974 | Offermann et al. |
| 3,931,524 A | 1/1976 | Herrin |
| 4,101,072 A | 7/1978 | Weaver et al. |
| 4,158,194 A | 6/1979 | McWaters et al. |
| 4,621,189 A | 11/1986 | Kumar et al. |
| 4,628,523 A | 12/1986 | Heflin |
| 4,699,447 A | 10/1987 | Howard |
| 4,805,175 A | 2/1989 | Knowles |
| 4,808,804 A | 2/1989 | Krichever et al. |
| 4,816,661 A | 3/1989 | Krichever et al. |
| 4,871,904 A | 10/1989 | Metlitsky et al. |
| 4,971,410 A | 11/1990 | Wike, Jr. et al. |
| 5,015,833 A | 5/1991 | Shepard et al. |
| 5,019,764 A | 5/1991 | Chang |
| 5,021,641 A | 6/1991 | Swartz et al. |
| 5,023,818 A | 6/1991 | Wittensoldner et al. |
| 5,059,777 A | 10/1991 | Wittensoldner et al. |
| 5,105,070 A | 4/1992 | Wike, Jr. et al. |
| 5,140,141 A | 8/1992 | Inagaki et al. |
| 5,144,120 A | 9/1992 | Krichever et al. |
| 5,149,949 A | 9/1992 | Wike, Jr. et al. |
| 5,198,650 A | 3/1993 | Wike, Jr. et al. |
| 5,477,044 A | 12/1995 | Aragon |
| 6,104,845 A * | 8/2000 | Lipoon et al. ......... 235/472.01 |

* cited by examiner

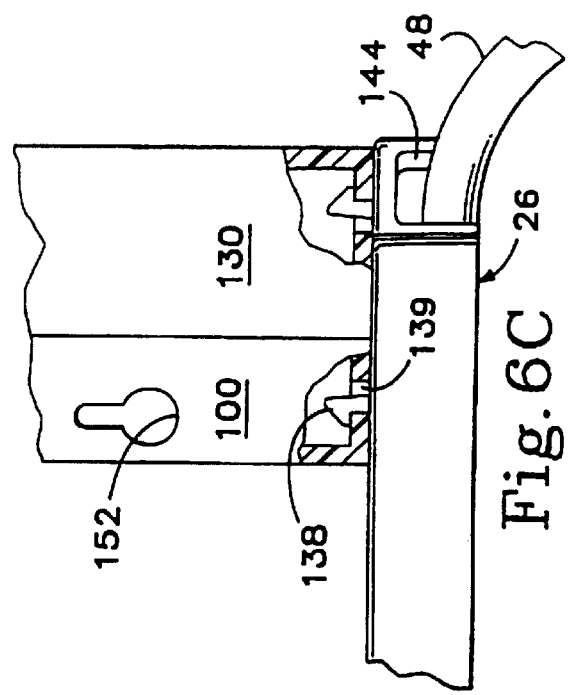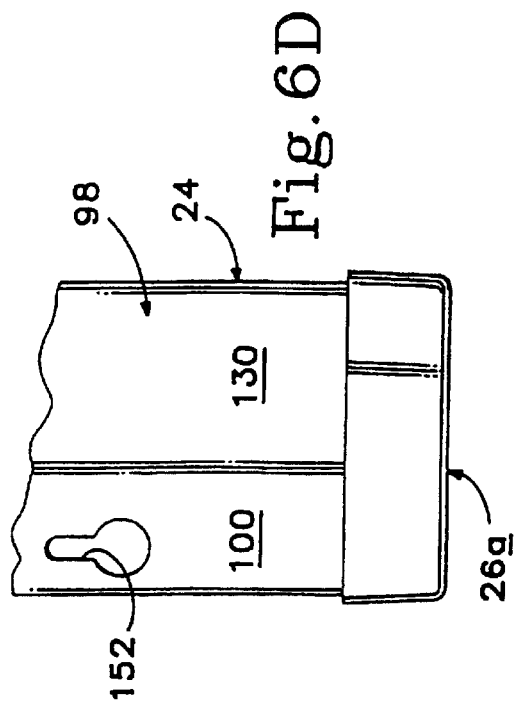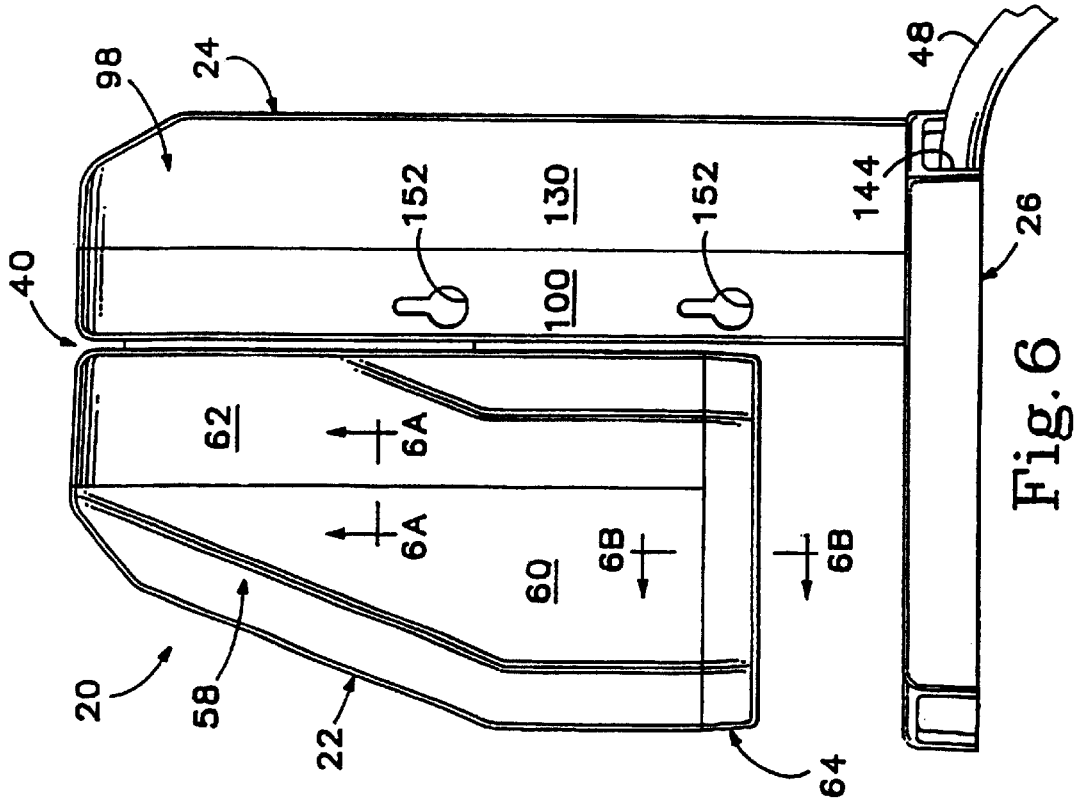

ULTRA-COMPACT BAR-CODE SCANNER

This is a continuation of Ser. No. 09/470,320 filed Dec. 21, 1999 now U.S. Pat. No. 6,224,150, which is a continuation of Ser. No. 08/325,967 filed Oct. 20, 1994, Pat. No. 6,065,676, which is a divisional of Ser. No. 07/870,689 filed Apr. 17, 1992 abandoned.

BACKGROUND AND SUMMARY OF THE INVENTION

This application relates generally to bar-code scanners such as those used in connection with point-of-sale (POS) terminals wherein coded retail items are presented to the scanner along a counter, the scanner automatically reads the bar code and communicates the retail item information to the POS terminal for transacting the sale of the item, inventory control, pricing, accounting, receipting, etc. More particularly, the invention concerns such a scanner that is miniaturized to produce a small, lightweight, low-cost, self-contained scanner the head of which is rotatably articuable and which can be mounted virtually anywhere and in any orientation.

Prior art POS terminal-connected mounted scanners require a large amount of retail outlet counter space and are relatively high-cost. Smaller scanners typically have relatively shallow and narrow viewing angles, or ranges, and thus are provided with extendable, retractable features, e.g. articuable, multiple arms enabling them to be extended and retracted for positioning adjacent a retail article. Of course, such require much manipulation by the retail sales associate and thus are inconvenient to use, as the scanners' heads must be constantly, or at least periodically, repositioned. Moreover, such scanners have been rendered smaller by removing much of the scanning electronics to a separate housing that requires under-counter space, which is at a premium. Essentially, the oversize problem is merely moved to another location, rather than being addressed and resolved. Known scan heads also have a larger volume than the scan head of the invention, which contributes to the lack of mounting flexibility in such scan heads.

There is a growing need for smaller, lighter weight bar-code rotatably articuable scanners that are versatile and inexpensive for use by retailers. There is also a growing need for rotatably articuable scanners that provide high performance, easily reachable scanning area that read bar codes quickly and accurately when retail articles are presented, with their bar codes generally facing the scanner, in a natural presentation or arc-sweeping motion by the retail sales associate. There is a growing need for rotatably articuable scanners that accommodate the variety of retail counter layouts of numerous retail outlets, and are interface-compatible with the variety of POS terminals that may be found therein.

Accordingly, it is a principal object of the invention to provide a highly functional rotatably articuable scanner that is extremely compact, yet extremely versatile in terms of compatibility with existing POS terminal interfaces and retail counter configurations.

Another important object of the invention is to provide such scanners that are capable of reading a bar code from an article independent of the axial orientation of the bar code relative to the scanner, and requiring only that the bar code be within a defined field of view of the scanner.

It is also a principal object of the invention to provide such a rotatably articuable scanners having improved viewing angles and depths to achieve higher scanning accuracy and reliability.

It is another important object of the invention to provide such scanners in an easily and quickly adjustable orientation to accommodate the idiosyncrasies of various retail counter configurations and checker preferences.

It is also a principal object of the invention to provide such a rotatably articuable scanners at extremely low cost of manufacture and field maintenance.

Yet another object of the invention is to meet the above objectives in a scanner that is unimposing and attractive.

Recent advances in bar code scanners have made it possible to scan bar codes generally independent of the axial orientation of the bar code relative to the read axis of the scanner. The so-called asterisk scan pattern, consisting of plural lines crossing generally at their centers with their endpoints being spaced apart in a generally circular arc, can be used to read conventional linear bar codes used in retailing, without concern for the orientation of the surface of the bar code about the axis of the asterisk scan pattern, because at least one of the lines of the pattern will extend thereacross. One such bar code scanner producing an asterisk scan pattern is described in U.S. Pat. No. 4,939,356 issued Jul. 3, 1990 to Rando, et al., entitled BAR CODE SCANNER WITH ASTERISK SCAN PATTERN (which patent is commonly assigned with the present application) the disclosure of which is incorporated herein by this reference.

Another important, relatively recent advance in bar code scanners is the use of the so-called "basket" reflecting mirrors arrangement in which a frusto-conical array of fixed planar mirrors is disposed circumferentially around a centrally located rotating mirror, wherein the basket mirrors and rotating mirror operatively are associated with a laser preferably disposed within a tubular member collinear with the axis on which the central mirror rotates to produce a variety of scan patterns including such an asterisk scan pattern. One such basket-type scanner useful in producing an asterisk scan pattern is described in U.S. Pat. No. 4,699,447 issued Oct. 13, 1987 to Howard, entitled OPTICAL BEAM SCANNER WITH ROTATING MIRROR (Reexamination Certificate BI 4,699,447, dated Jul. 3, 1990) (which patent is commonly assigned with the present application) the disclosure of which also is incorporated herein by this reference.

Briefly summarizing the invention, an extremely compact, lightweight, low-cost, self-contained, visible laser diode (VLD) printed bar code scanner is provided with a great range of adjustability and versatility. Preferably, a scan head housing the optical subsystem is fixedly rotatably connected with a tower housing the heat-generating electronic components of the scanner. The scan head housing contains a spin motor control, reflected light pattern detector, while the tower housing contains a bar code decoder and communication means, connectable with a conventional POS terminal via a multiple physical/electrical interface bulkhead located in a base for the tower housing. The scanner presents an extremely small footprint, and provides for its mounting in virtually any orientation and location. The scanner of the invention provide for hands-free scanning and one-handed adjustability.

Preferably, the optical subsystem uses a basket-type dispersal/collecting mirror array configured around a rotating planar folding mirror driven by an extremely compact cup (brushed) DC motor. Most of the optical components within the laser beam's path, as well as most of the mounting structures and housing components may be rendered in injection molded plastic to reduce weight and cost. The organization of components within the scan head and tower housings, as well as the partitioning thereof between the two, provides for convection cooled operation of the optical subsystem and rotation of the scan head, which has a center of mass near the scan head's axis of rotation, thereby making the scanner extremely stable despite its small footprint. Ease of depot and field maintenance and calibration of the optical subsystem is very simple because the replaceable components and subsystems may be easily removed and replaced without the need for realignment of the optical system. The scan head may be easily removed from the tower housing for convenience of maintenance and repair.

Unprecedented functionality and versatility in an ultra-compact bar code scanner is achieved by minimizing the length of the optical beam path, reducing component size, partitioning the optical subsystem from the associated electronics and choosing, configuring and mounting components of both for optimal compactness in an easily assembled, maintained and operated form.

These and other objects attained, and advantages offered, by the present invention will become more fully apparent as the description that now follows is read in conjunction with the accompanying drawings.

BRIEF DESCRIPTION OF THE DRAWINGS

FIG. 6 is a rear elevation of the scanner housing.

FIGS. 6A–6D are greatly enlarged fragmentary sections taken from FIG. 6 showing, respectively, a labyrinth seal detail, details of the window mounting, attachment of a base to a tower housing, and an alternate base embodiment.

DETAILED DESCRIPTION OF THE PREFERRED EMBODIMENT

Figure 1:
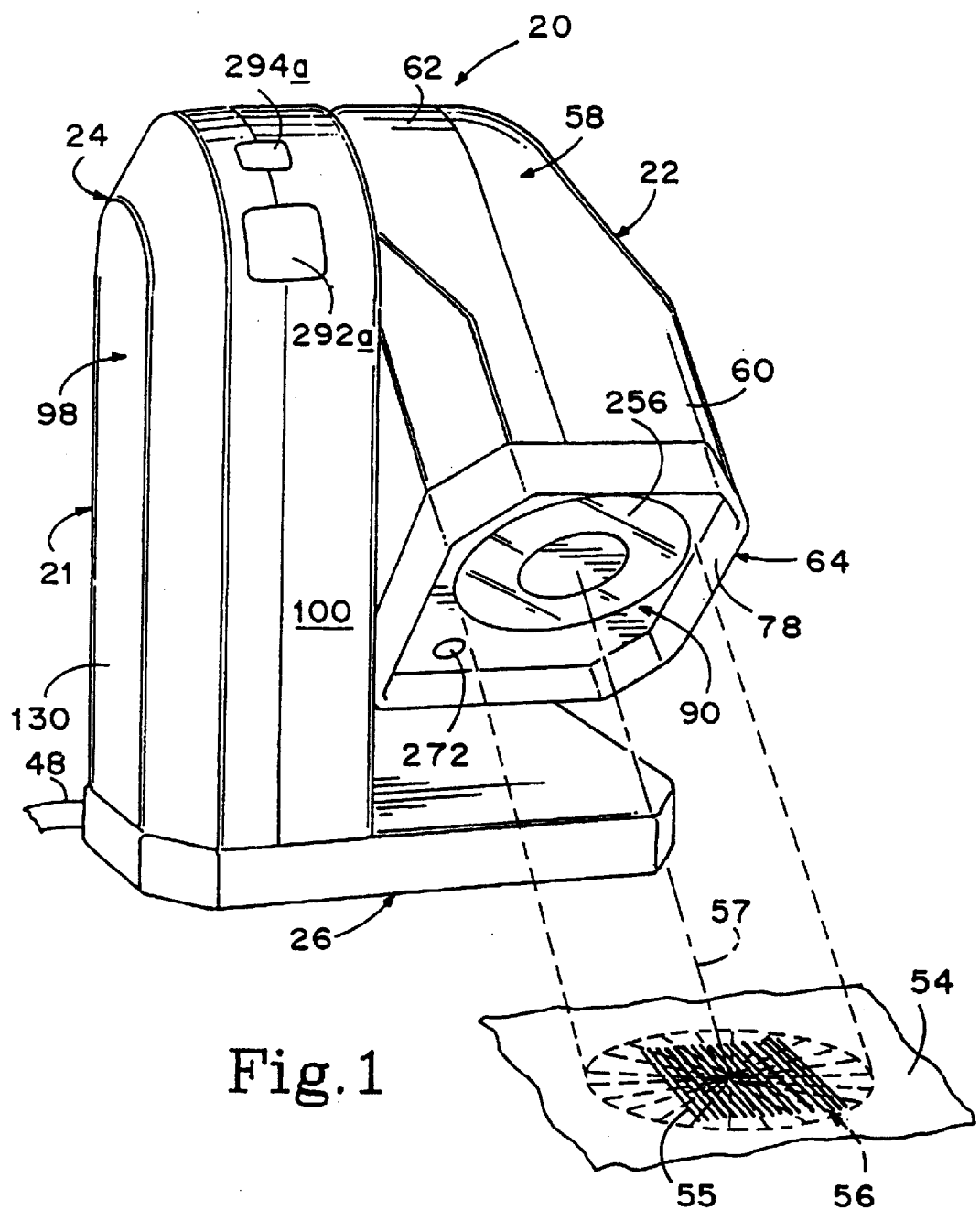
FIG. 1 is a perspective view of the scanner housing of the invention, with a scan head depicted in an operating position.

Turning now to the drawings, and initially to FIG. 1, the scanner of the invention is depicted generally at 20. Scanner 20 includes a scan head, or scan module, which is adjustably, rotatably mounted on a scanner tower 24, which, in the preferred embodiment, in turn is mounted on a scanner base 26. The scanner includes a scanner housing 21 which is bifurcated into a scan head housing and a tower housing, which will be described below in greater detail. The scanner of the invention is an ultra-compact device which contains all of the optics and electronics in a single housing. There is no requirement for external components other than a power supply, which is generally provided in a conventional, connected, point-of-sale terminal, or an AC/DC power module.

Figure 2:
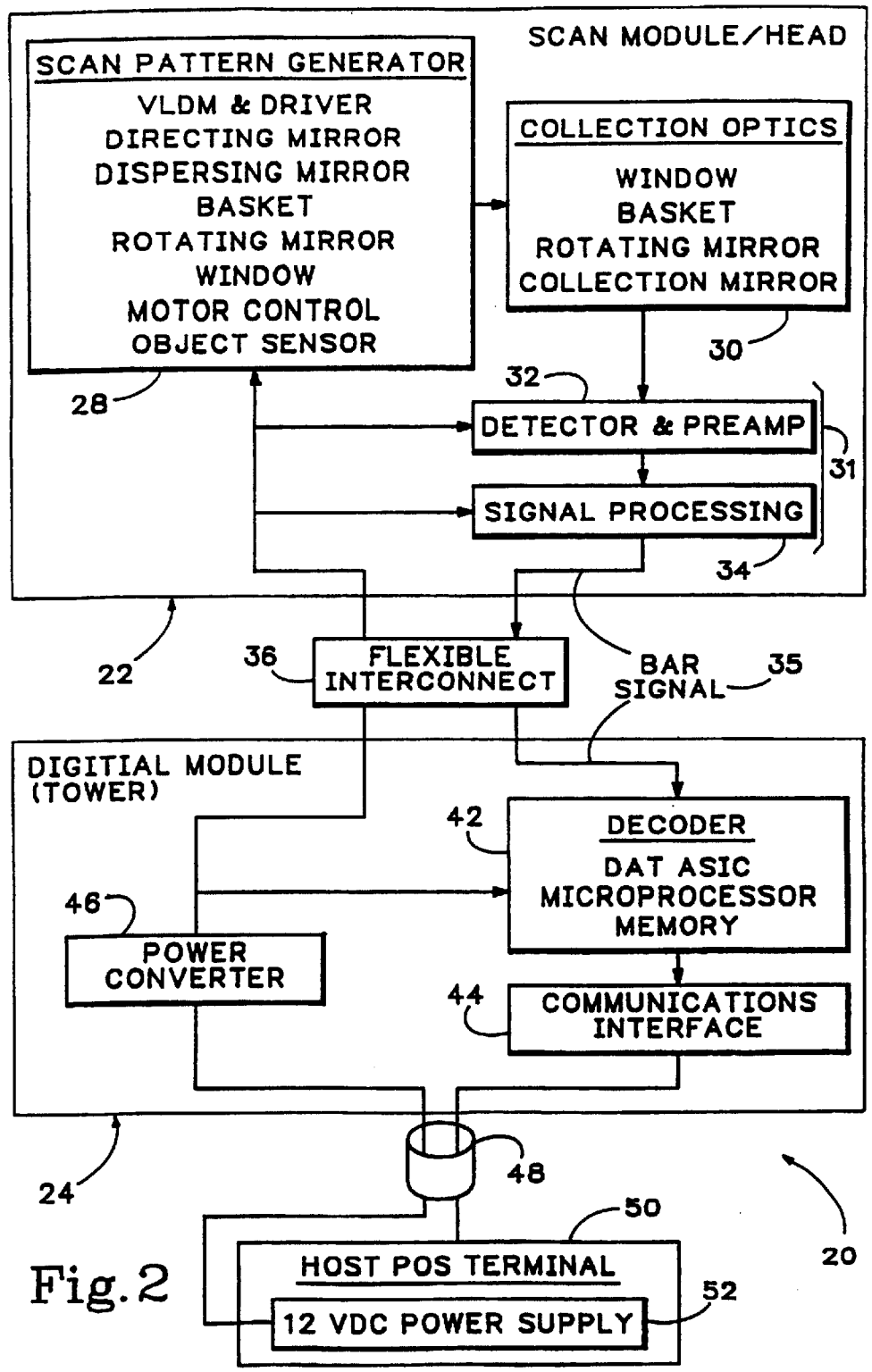
FIG. 2 is a schematic system block diagram of the scanner made in accordance with its preferred embodiment.
Figure 7:
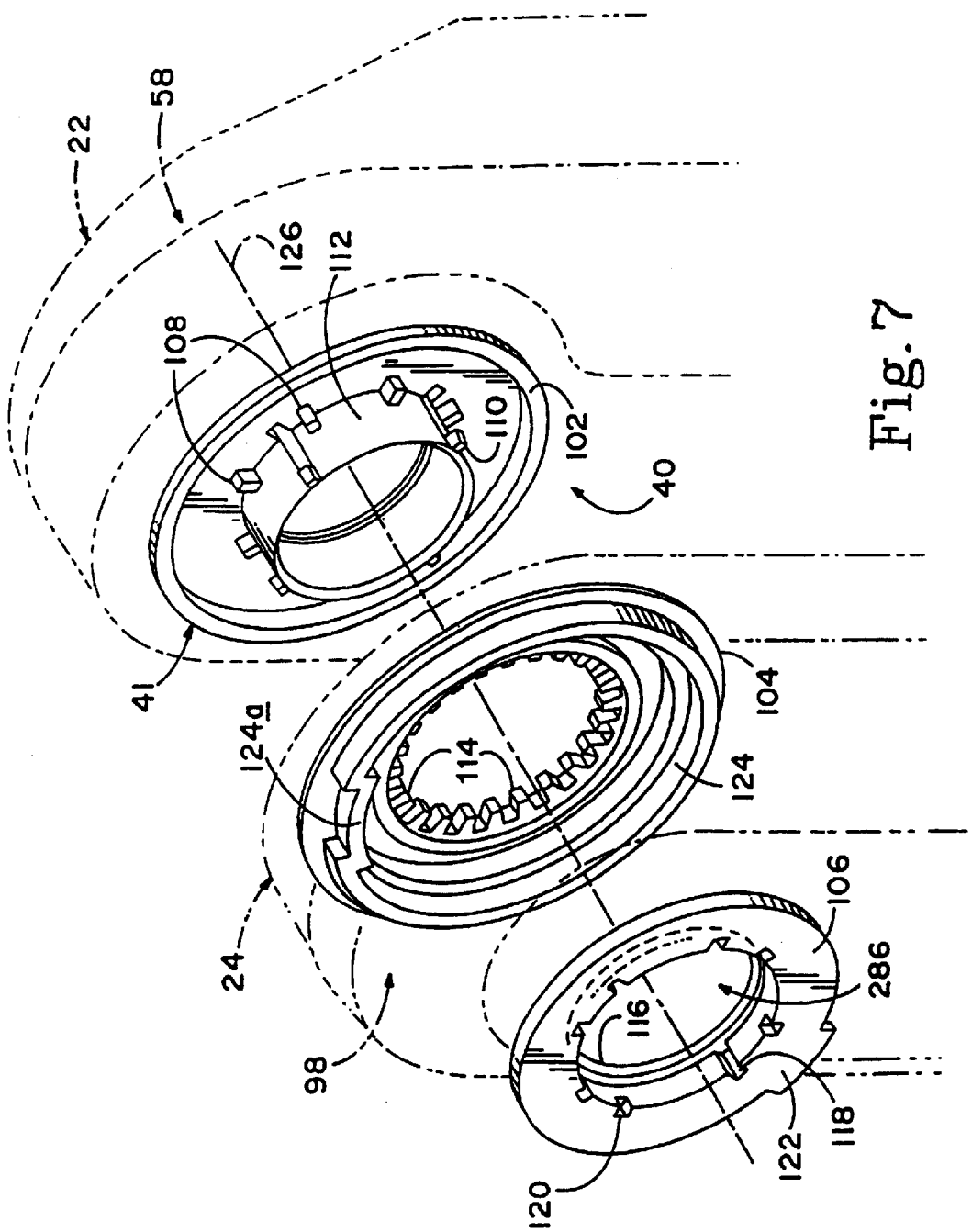
FIG. 7 is an exploded isometric view of the mounting for a scan head.

Referring now to the block diagram of FIG. 2, scan head, or scan module, 22 includes a scan pattern generator 28, collection optics 30, processor means 31 which includes a detector and pre-amp 32 and a signal processing means, or circuit, or mechanism, 34. The components within scan head 22 are connected by a flexible interconnect 36 to the electronics contained in tower 24. Flexible interconnect 36 includes a wiring harness 38 (FIG. 4) and a rotation mechanism 40, the latter of which, in the preferred embodiment, takes the form of a splined positioning mechanism 41 (FIG. 7).

Scanner tower 24 includes a decoder 42, a communications interface 44, and a power conversion/distribution mechanism, or power converter, 46.

Scanner 20 is connected, by a cable 48, to a host point-of-sale (POS) terminal 50. Terminal 50 supplies a 12 VDC power source 52 to power conversion/distribution mechanism 46 in tower 24, which distributes required DC power levels to various components of scanner 20. It will be understood that POS terminal 50 is of any conventional design and is generally used to determine item identification from the decoded data supplied by the scanner, which ultimately would result, for example, in the generation of a sales or charge receipt. Of course, other applications of the code scanner are within the scope of the invention and other sources of power may be provided.

A communication means is provided for communicating the information from scanner 20 to an external device 50. In the preferred embodiment, communication means includes a microprocessor, shown as being part of decoder 42 (FIG. 2) executing firmware within a memory, also part thereof, and communications interface 44. Those of ordinary skill in the art will appreciate that communications means may have any desired physical and logical interface protocol that enables scanner 20 to communicate over a cable 48 with an external terminal or other device, such as POS terminal 50. In the preferred embodiment, communication means includes a multiple interface, by which is meant that it supports a plurality of terminal interface standards, including RS232, OCIA and 46XX, and a clock-selection scheme implemented in circuitry and firmware associated with the microprocessor that permits scanner 20 to communicate in any one of these protocols depending upon what terminal is connected and/or which standard is desired.

It should be appreciated that while scanner 20 is generally intended to be used with the conventional UPC printed bar code and/or industrial printed bar codes, the scanner is operable to read any type of coded indicia which may be used to identify an object, such as embossed or engraved codes, arrangements of geometric forms and various types of three dimensionally encoded information, so long as appropriate de-coding electronic circuits are provided. Referring again to FIG. 1, as used herein, "printed code" or printed bar code" should be understood to include any coded indicia of any type, such as that shown at 55, located on a surface, which may be on the article itself as depicted at 54, using any process, including those described above, which is capable of being scanned by a scan, or light, pattern, such as that depicted in FIG. 1 at 56. Scan pattern 56, in the preferred embodiment, is generally conical in shape, having a central axis 57, and is made up of 11 scan lines, for reasons that will become apparent.

Processor means 31, and now referring to FIGS. 1 and 2, generates a digital signal representative of scanned code 55, which is identified in FIG. 1 as a bar signal. The signal is characterized by a bi-level, low voltage transition between two voltage level which represents a transition in a bar code at light-to-dark and dark-to-light edges.

Scanner Housing

Turning now to FIGS. 3 through 6, components of scanner 20 will be described in greater detail. Scan head 22 includes a scan head housing 58, which is formed of three separate pieces in the preferred embodiment. The three pieces of scan head housing 58, which also is referred to herein as a scanner housing first portion, or first housing, are joined together by interlocking parts, eliminating the necessity for any type of fasteners or adhesive binding. Scan head housing 58 includes an outboard portion 60, an inboard portion 62, and a bezel 64. A flexible catch 66 is located on outboard portion 60, which interlocks with a conformal catch receiver 68 in inboard portion 62. A labyrinth seal 70, best shown in FIG. 6A, includes a projection 72 on outboard portion 60, and a receiver 74 on inboard portion 62. Seal 70 is more than adequate to prevent the incursion of dust and undesirable humidity to the interior of scan head 22 when the scan head is stored or used. Ribs 76 are provided at intervals along the interior of inboard portion 62 to rigidize scan head housing 58.

Figure 6A:
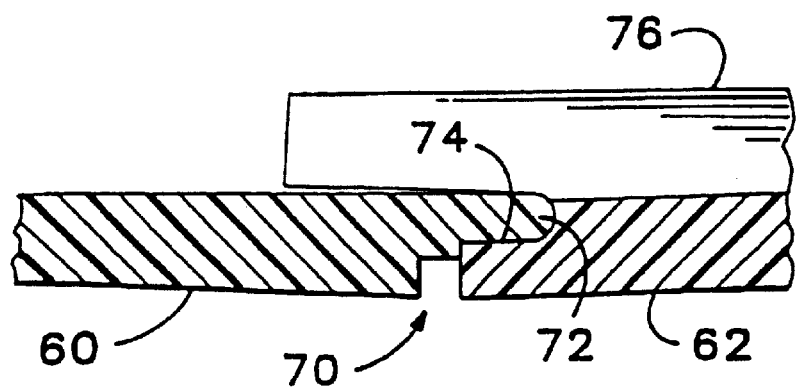
Figure 6B:
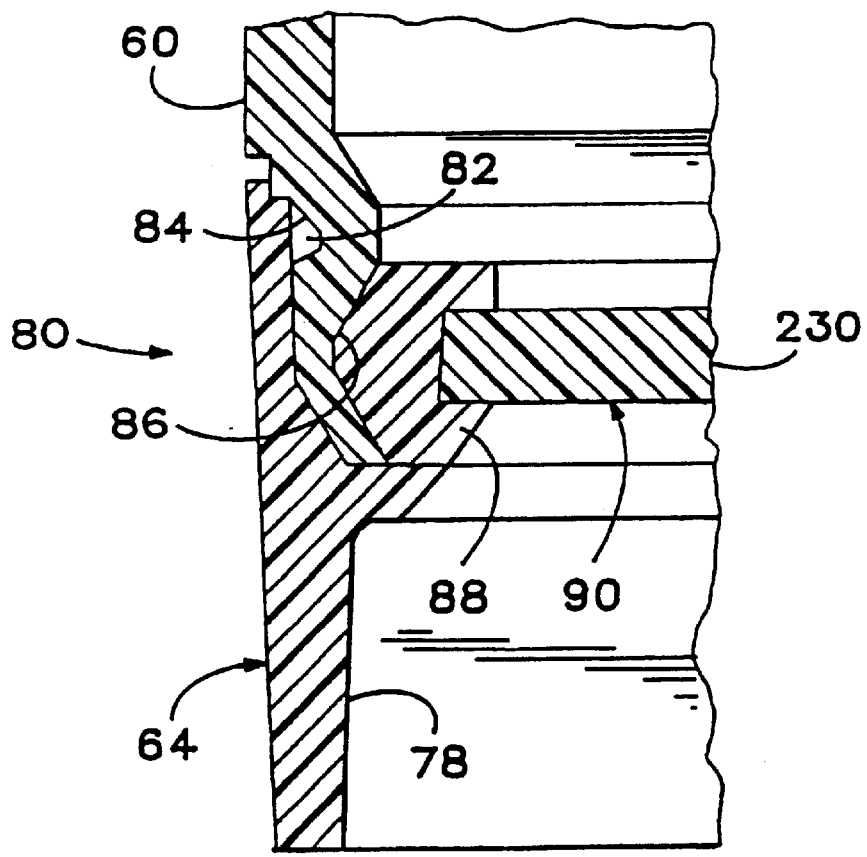

Bezel 64, and now referring to FIG. 6B, is constructed to snap-fit over portions 60 and 62, thereby to maintain the two portions in a sealed relationship. The bezel includes a shade portion 78 which extends outwardly from housing 58 when assembled, and a closure portion 80, having a rib 82 thereon which is received in a conformal depression 84 located about the periphery of outboard portion 60 and inboard portion 62.

The construction of outboard portion 60, inboard portion 62 and bezel 64 is such that the three components have a snap-fit, and may be assembled or disassembled without the use of any tools whatsoever. Outboard portion 60 and inboard portion 62 have a window retaining receptacle 86 formed about the free ends thereof, which receive a soft durometer seal 88 therein, which in turn receives a window 90.

This arrangement of mating, joining elements--including catch 66, receiver 68, the components of the labyrinth seal 70 and the interlocking of bezel 64 to scan head housing 58--provides a hinge-like opening for the inboard and outboard portions of housing 58. A similar construction is used to join components of tower 24. The external volume of tower 24 preferably does not exceed approximately 492 cm$^3$ (31.5 in$^3$), more preferably does not exceed approximately 459 cm$^3$ (28 in$^3$) , and is in the preferred embodiment approximately 433 cm$^3$ (26.4 in$^3$). The external volume of scan head 22 preferably does not exceed approximately 574 cm$^3$ (35 in$^3$), more preferably does not exceed approximately 524 cm$^3$ (32 in$^3$) and is in the preferred embodiment approximately 492 cm$^3$ (31.5 in$^3$). The total external volume of the scanner, including scan head 22 and scanner tower 24, but excluding base 26, preferably does not exceed approximately 1229 cm$^3$ (75 in$^3$), more preferably does not exceed approximately 1065 cm$^3$ (65 in$^3$), most preferable does not exceed aproximately 967 cm$^3$ (59 in$^3$) and is in the preferred embodiment approximately 949 cm$^3$ (57.9 in$^3$). As used herein, volume refers to the displacement volume of a solid structure having the same exterior surfaces as scanner 20.

Still referring to FIGS. 3 through 6, scanner tower 24 is, in the preferred embodiment, a two-piece structure, the first piece of which includes part of a mounting 40 for scan head 22. Referring now to FIG. 7, in the preferred embodiment of scanner 20, mounting 40 includes a splined positioning mechanism 41 which has a head ring 102 on scan head 22, a tower ring 104 on tower 24 and a rotation limiter 106, which is operable, in the preferred embodiment, both to limit rotation of scan head 22 relative to tower 24 to a rotation of 270° in a single plane and physically to retain the scan head on tower 24. In its maximum laterally extended position, i.e. when rotated 90° from its at-rest position to a horizontal position, scan head 22 increases the projected footprint of the entire scanner housing to something preferably less than approximately 129 cm$^2$ (20 in$^2$). It may be seen then that the retail counter space occupied by scanner 20 is extremely small, whether the scanner is deployed for operation or is stowed in its at-rest configuration.

Head ring 102 includes plural splines 108 and plural retaining dogs 110, which are mounted on a cylindrical structure 112. Cylindrical structure 112 and its splines and dogs are received in tower ring 104, wherein the splines engage plural teeth 114 to positively lock scan head 22 in a desired operating or stowage position relative to scanner tower 24. A spring 116 is carried on rotation limiter 106. Spring 116 may be compressed in order to slip rotation limiter over retaining dogs 110 and through slots 118, whereupon rotation limiter 106 may be rotated and to position retaining dogs 110 over dog retainers 120 in order to retain rotation limiter on cylindrical structure 112. Spring 116 will urge rotation limiter 106 away from tower ring 104, thereby retaining splines 108 within teeth 114.

Scan head 22 may be easily rotated by pulling the scan head relatively away from scanner tower 24, thereby disengaging splines 108 from teeth 114. The scan head may be rotated relative to the tower as desired. Incremental, or step-wise, rotation in 15° steps up to 180° rotation (in one direction) and in 15° steps up to 90° (in the opposite direction), or 270° total, is provided in the preferred embodiment, which limitation is provided by a circle element 122 on rotation limiter 106 which cooperates with a channel 124 on tower ring 104 to limit rotation along a scan head rotation axis 126. In the preferred embodiment, circle element 122 subtends an angle of 60° while a stop portion 124a of channel 124 subtends an angle of 30° thereby limiting the rotation of scan head 22 relative to tower 24 to 270° which is nominally a 90° rotation rearward from the at-rest position shown in FIG. 4, and a 180° rotation from the at-rest position. Such rotation limits enables the scanner to be mounted not only in the depicted upright position on base 26, but allows sufficient rotation of scan head 22 relative to tower 24 to allow mounting of the scanner to an under-counter surface, walls, and POS terminals. limiting the rotational adjustability of scan head 22 relative to scanner tower 24 ensures that flexible interconnect 36 is not unduly torqued and stressed.

Splined positioning mechanism 41 allows for the positioning and adjusting of scan head 22 thereby to reposition the scan pattern relative to the entire scanner without physical movement of the entire scanner. Known scanners are either fixed, thereby lacking adjustability and any ergonomic considerations, or are hand held, thereby limiting the ability of the user to manipulate objects being scanned, or have inconvenient or cumbersome adjustment mechanisms. The positioning mechanism of the invention provides the ability to position and positively lock the scan head in a desired position for indefinite periods of time, without slippage or otherwise unintended rotation.

In addition to the preferred embodiment of the mounting for scan head 22 previously described, several alternative forms are useable to accomplish the goal of positioning scan head 22 relative to tower 24 and maintaining the relative position over the course of operation.

Figure 7A:
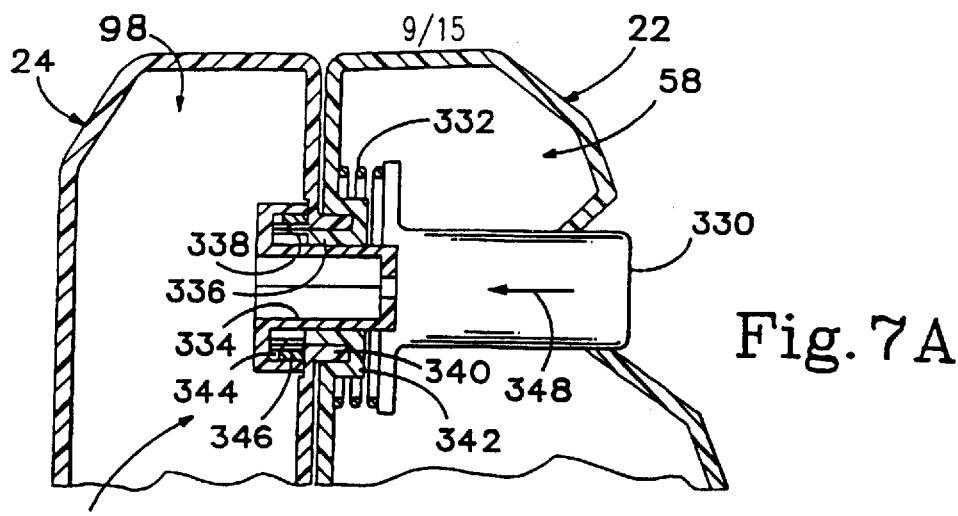
FIGS. 7A, 7B and 7C are medial section front elevations of alternate embodiments of the scan head mounting.

The first alternate embodiment of mounting 40 is depicted in FIG. 7A, is depicted generally at 40a, and is referred to herein as a push-button release. Mounting 40a incorporates a button 330 which is located in scan head 22, which is urged to an engaged position, depicted in FIG. 7A, by a spring 332. Button 330 includes a spline-bearing portion 334, which extends through an opening 336 in scan head 22 and opening 338 in tower 24. As depicted in FIG. 7A, tower 24 includes an alignment portion 340 which is received in a conformal alignment portion 342 in scan head 22.

Spline-bearing portion 334 includes a number of splines 344 carried thereon, which interact with conformal splines 346 on tower 24. When button 330 is in its engaged position, the splines align with one another in an engaged relationship, thereby locking scan head 22 relative to tower 24. If it is desired to rotate scan head 22 relative to tower 24, button 330 is pressed inwardly, in the direction of arrow 348, thereby disengaging the splines on the button and on the tower, permitting relative rotation between scan head 22 and tower 24. The provision of button 330 allows one-handed adjustment of scanner 20.

Figure 7B:
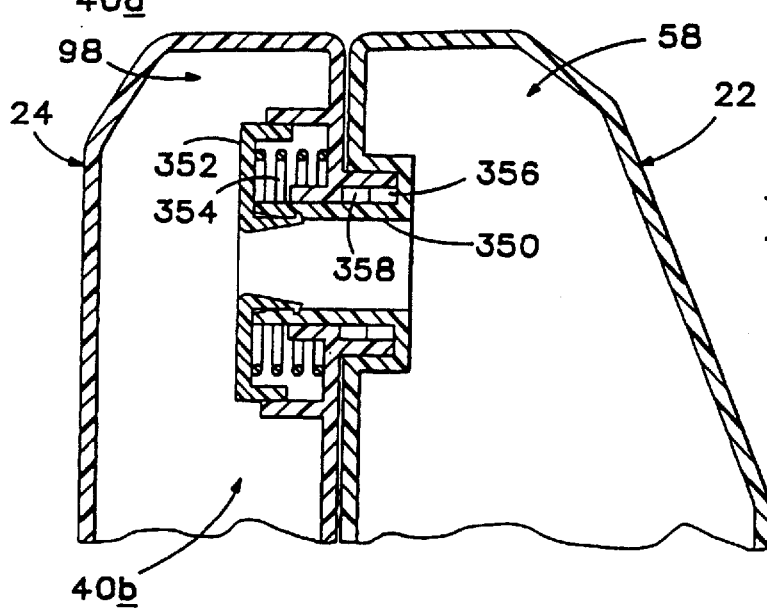

Referring now to FIG. 7B, a mounting 40b is depicted. Mounting 40b is a modification of the push-button configuration of FIG. 7A. Scan head 22 includes a spline bearing portion 350 which extends into tower 24. A retaining ring 352 is urged inwardly in tower 24 by a spring 354 to maintain scan head 22 in an engaged position with tower 24. Scan head 22 includes splines 356 and spline bearing portion 350 includes splines 358, which engage one another.

In order to rotate scan head 22 relative to tower 24, the scan head is pulled outwardly along rotation axis 126 so that splines 356 and 358 disengage, thereby permitting relative rotation of scan head 22 relative to tower 24.

Figure 7C:
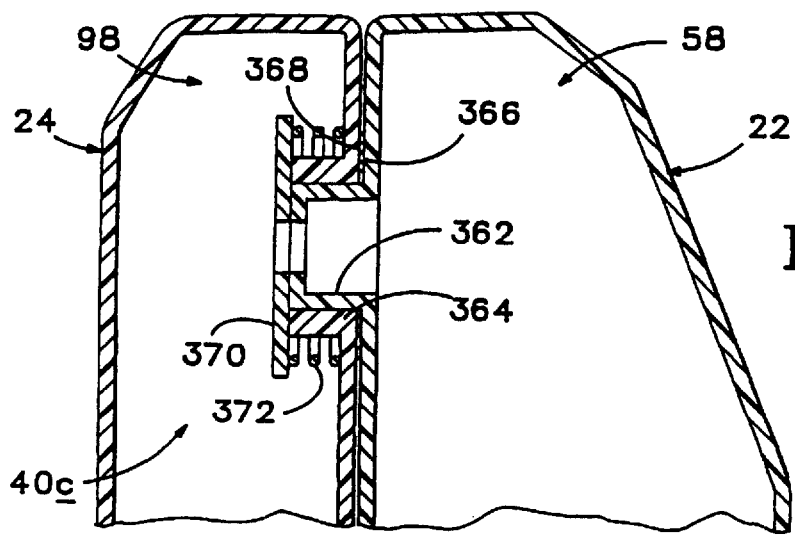

Referring now to FIG. 7C, mounting 40c is depicted. Mounting 40c includes a projection 362 on scan head 22, which extends into a conformal scan head projection 364 on tower 24. Serrated, or checkered, regions 366, 368 are provided on the mating surfaces of scan head 22 and tower 24, respectively, to provide a frictional lock between the scan head and the tower. A retainer 370 is fixed to projection 362 and provides a reaction surface for a spring 372 which urges the checkered portions towards one another. The checkered area may be formed of non-conformal surfacing, which relies solely on a friction fit to maintain relative position between scan head 22 and tower 24, or, the regions may be formed with serrations, such as conformal teeth, so that distinct, repeatable orientation of scan head 22 relative to tower 24 may be achieved.

A variation of mounting 40c may include the provision of a locking knob, whereby the scan head is positively locked relative to the tower. Such a configuration is by far the least expensive to construct, however, requires two-handed operation to adjust the scan head relative to the tower.

The mounting, or rotational hinged design, is desired to provide a minimum of 90° of rotation between the scan head and the tower, but, because of the presence of harness 36 which extends between scan head 22 and tower 24, is best restricted from full 360° rotation. A compromise position, as set forth in connection with the preferred embodiment, is to provide 270° of rotation between scan head 22 and tower 24.

In order to remove scan head 22 from tower 24 for servicing, the mounting must be disassembled. Such disassembly will generally be accomplished from the tower-side of the hinge and will require removal of the internal components of the tower, which will be described next.

Referring now to FIGS. 1 and 4–6, scanner housing 21 includes a second housing portion, or tower housing, 98. Housing 98 includes a tower cover 130 which fits on a tower first piece 100 by means of a flexible catch 132 and a catch receiver 134, which are constructed similarly to the same-named structures on scan head housing 58. A labyrinth seal 70 is provided between the two pieces of tower housing 98. The housing includes integrally formed snap fittings, which, in the preferred embodiment, include a latch 136, on first piece 100 and a receiver 137 on cover 130, which hold the two halves of the tower housing together.

The tower housing snap-fits onto scanner base 26, which has a generally flat appearance. The base has an upper surface which receives tower 24 thereon, wherein the two elements snap-fit together. In the preferred embodiment, a grip 138 on base 26 fits in a notch 139 in tower 24. The base also has a lower surface and spaced-apart sides about the periphery thereof.

Figure 5:
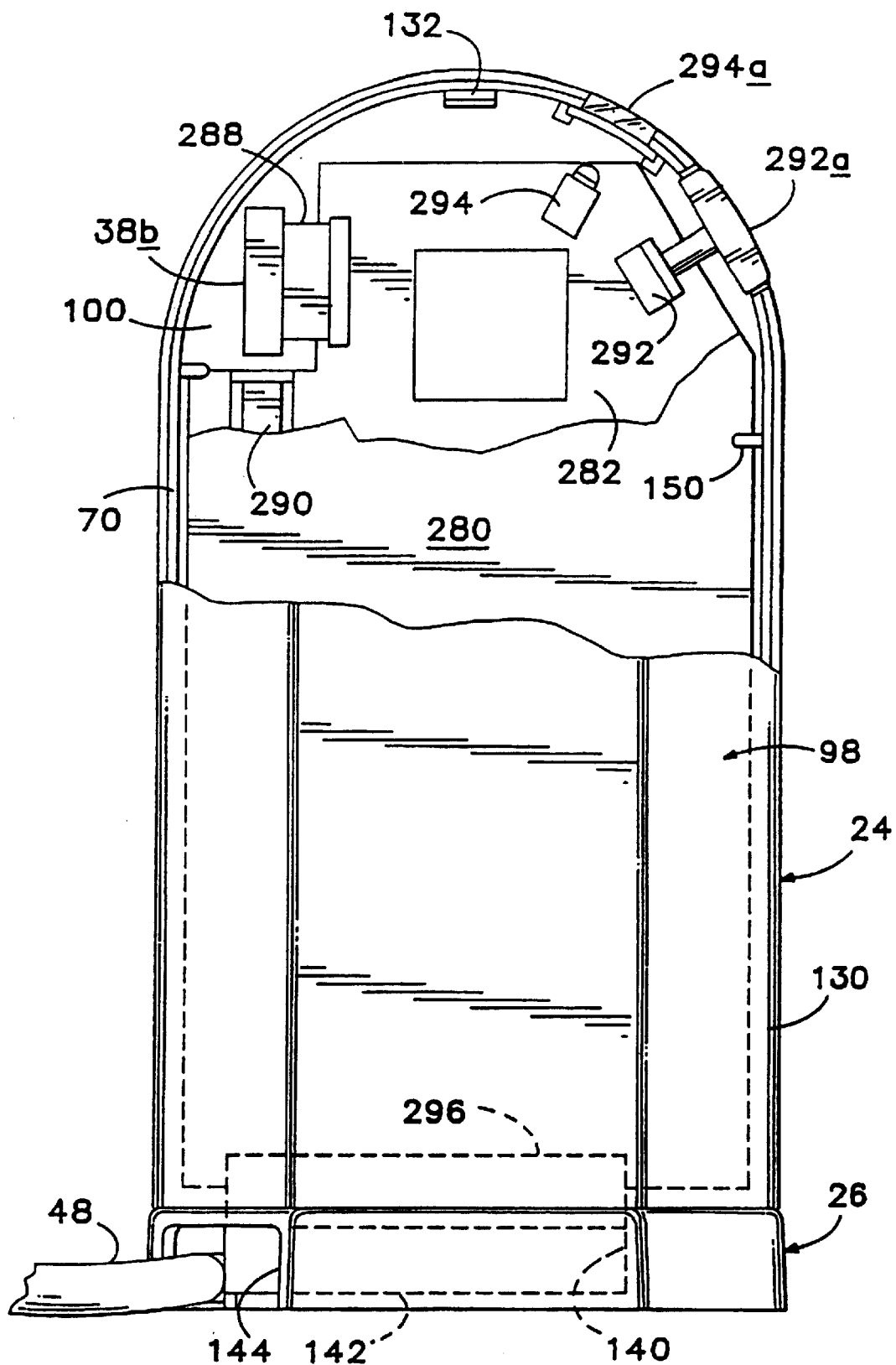
FIG. 5 is a left side elevation of the scanner housing, with portions broken away to show interior detail.
Figure 8:
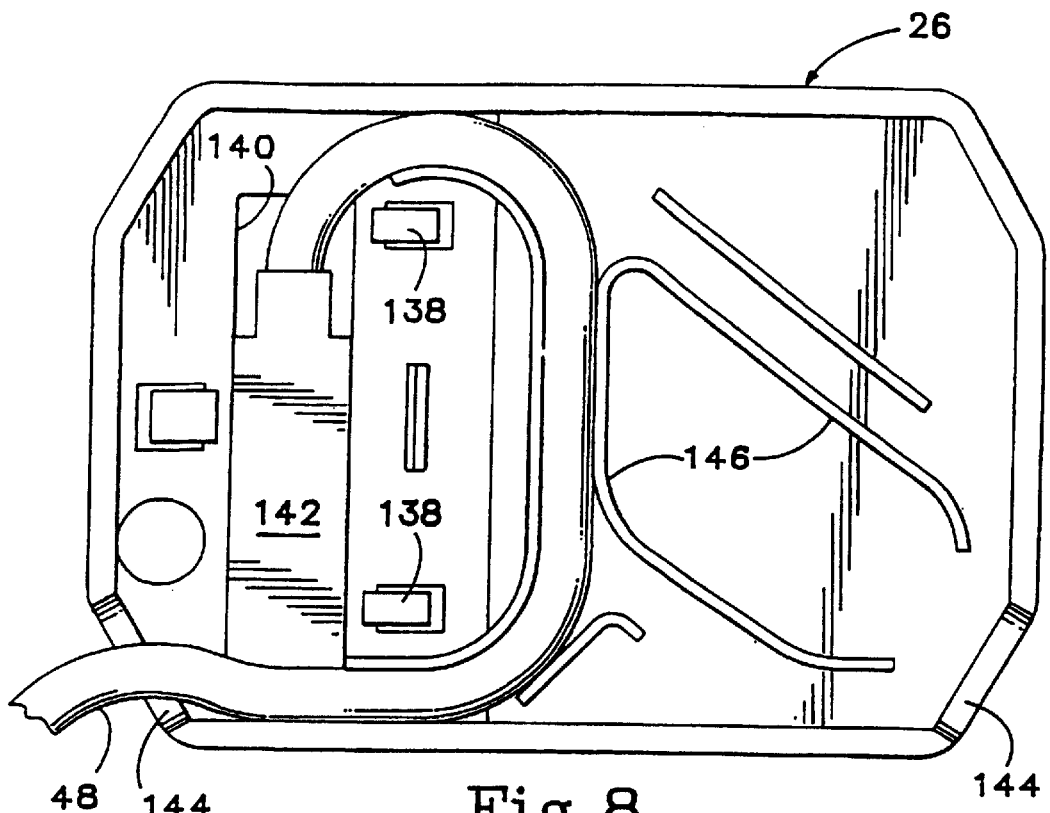
FIG. 8 is a bottom plan view of a base of the scanner of FIG. 1, illustrating the cable routing mechanism of the preferred embodiment.
Figure 8A:
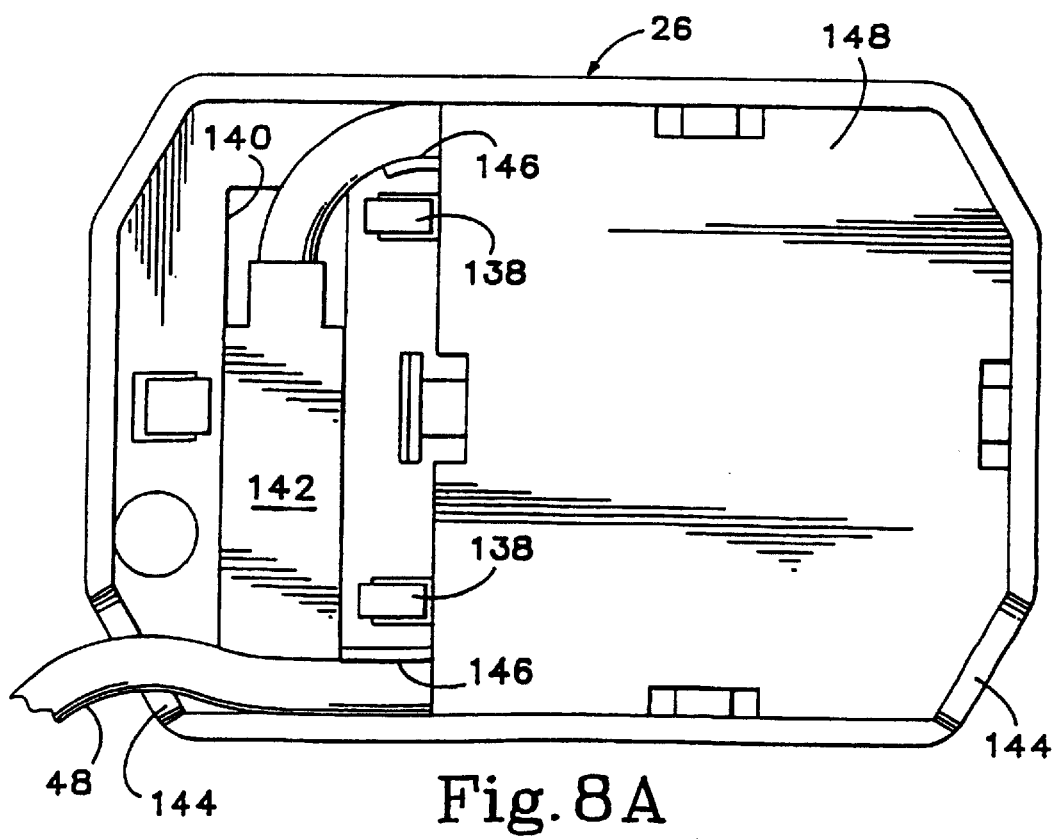
FIG. 8A is a bottom plan view of the base depicting a cover therefor.

Briefly referring now to FIGS. 5, 8 and 8A, base 26 includes a receptacle 140 for receiving a cable connector 142, for connecting a cable 48 from scanner 20 to POS terminal 50. Receptacle 140 extends between the upper and lower surfaces of the base, and provides for the connection of connector 142 to a plug which is located in tower 24. In some instances, it may be desirable or necessary to route cable 48 out of base 26 through various ports 144 formed in the side of base 26. To this end, cable guides 146 are provided, which define multiple cable paths on the lower surface of base 26 and which serve to route cable 48 to a desired port at the periphery of the base, thereby further increasing the versatility and mounting configurability of scanner 20. As depicted in FIG. 8A, a cover 148 may be provided to partially enclose the bottom of base 26, thereby retaining cable 48 in the base.

Returning now to FIGS. 4 and 5, tower first piece 100 is intended to receive two printed circuit boards (PCBs) 280, 282 therein, and includes mounting points 150 for fastening the PCBs thereto. For the sake of compactness, it will be appreciated that the PCB assemblies made in accordance with the preferred embodiment of the invention may be single or multi-layered and use, wherever possible, surface-mount electronic components.

Referring to FIGS. 6C and 6D, key-hole mounting structures 152 are provided to affix tower 24 to a surface, such as a counter underside, or directly to a POS terminal. When structures 152 are used, the alternate form 26a of the base is used. Importantly, mounting structures 152 permit lightweight, ultra-compact scanner 20 to be positioned and oriented virtually anywhere and anyway. For example, scanner 20 may be affixed by structures 152 (and corresponding post pairs, not shown) to the ceiling, on a wall, on the side of a terminal, on a counter or even in a doorway, if desired.

The Optical Subsystem

Figure 3:
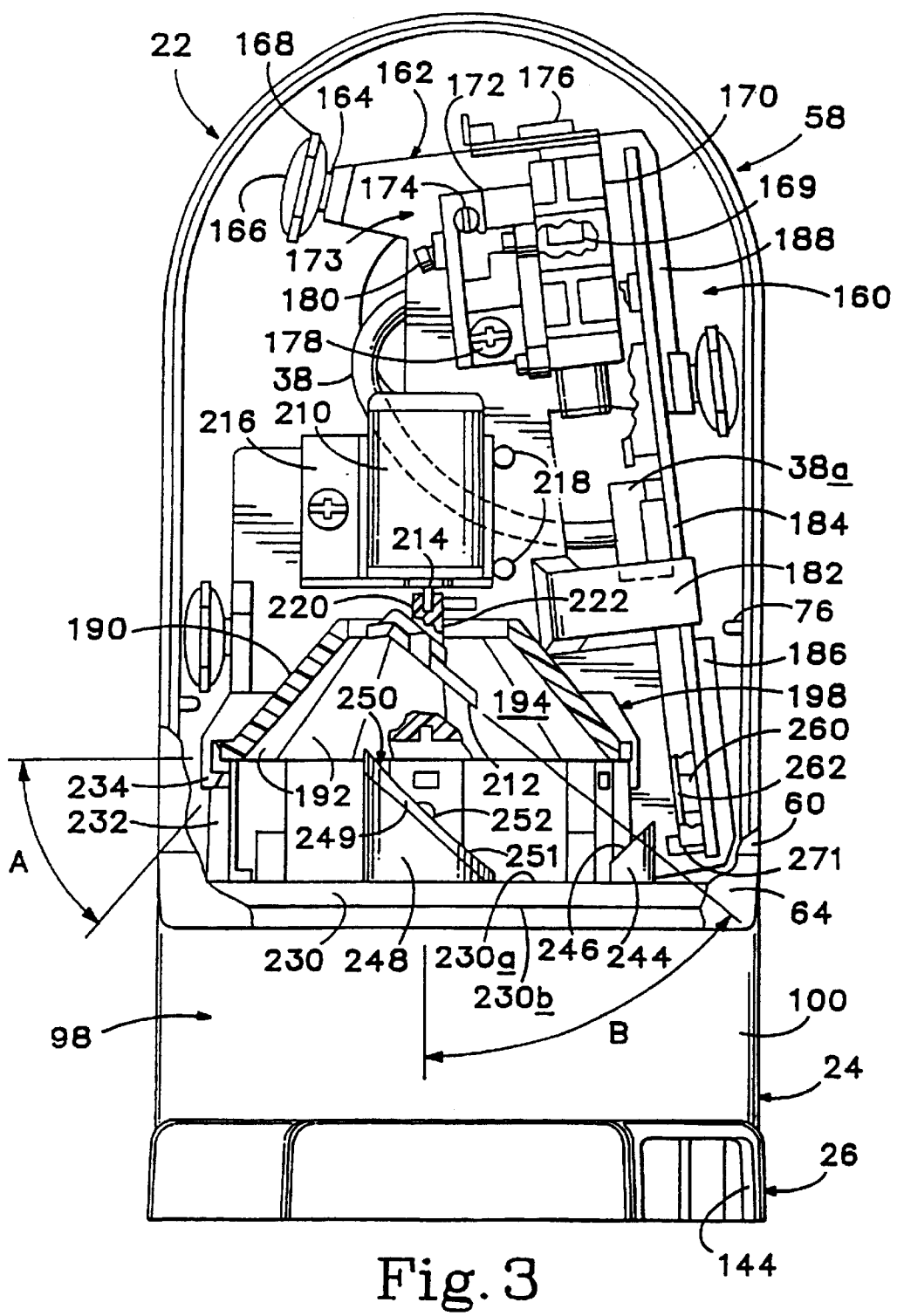
FIG. 3 is a right side elevation of the scanner housing and optical subsystem that forms a part of the scanner, with portions broken away to show detail.
Figure 4:
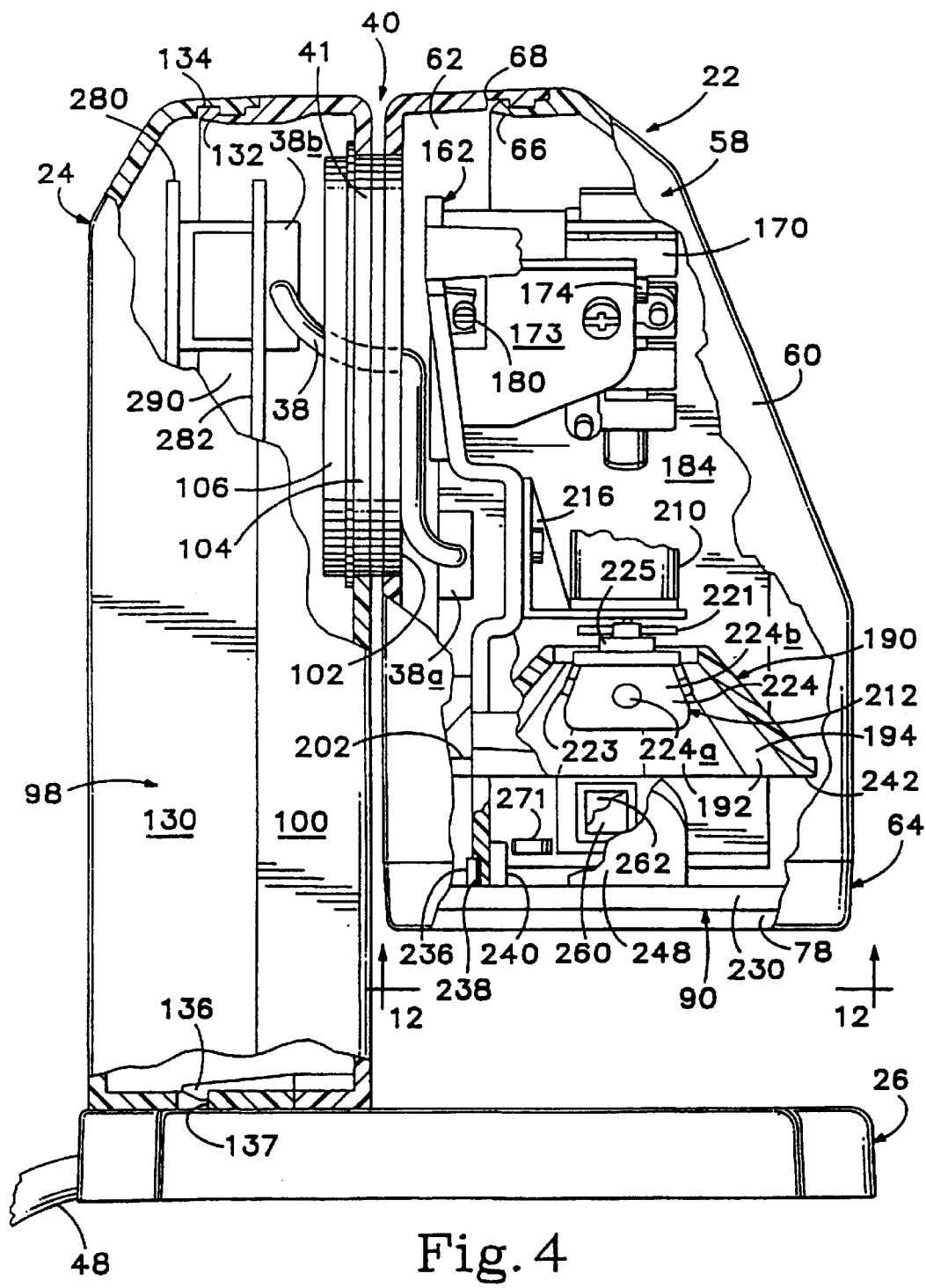
FIG. 4 is front elevation of the scanner of FIG. 3, with portions broken away to show detail.

Referring now to FIGS. 3 and 4, an optical subsystem, shown generally at 160, will be described. Optical subsystem 160 includes a chassis 162 which is contained within scan head 22. Chassis 162 includes mounting points 164 which receive shock mounts 166 thereon. Shock mounts 166 are received on optical subsystem chassis retainers 168 on outboard portion 60 of scan head housing 58. Optical subsystem 160 may be seen also to include scan pattern generator 28 and collection optics 30 (which, it will be understood, share certain elements, i.e. the window, the basket, the rotating mirror, the motor control).

The Light Source

Scanner 20 incorporates a visible laser diode (VLD) as a source of coherent light which is projected from scan head 22 onto the object being scanned. A VLD light source 169 is contained within VLD housing 170, which is secured to a VLD housing mount 172. VLD 169 emits a coherent light laser beam typically in the 600 nm to 800 nm range.

Mount 172 is constructed so that VLD housing 170 is fixed to the mount, but is adjustable relative to chassis 162 in two orthogonal planes. Adjustment is accomplished by an adjustment mechanism 173, which includes a VLD adjusting screw 174, which accounts for alignment, in a first plane, or about what will be referred to herein as a Y-axis. A first PCB 176 is carried on the VLD housing mount 172 and contains the circuitry which drives the VLD within VLD housing 170. VLD housing mount 172 is secured to chassis 162 by means of a single screw-type fastener 178. A second VLD adjusting screw 180 provides alignment of VLD housing 170 in a second plane orthogonal to the first, or about what will be referred to herein as an X-axis. Chassis 162 includes PCB mount 182, which grasps one side of a PCB 184, and two other PCB mounts 186, 188, which grasp the other side of PCB 184.

The Optical Basket

Importantly contributing to the high functional density of scanner 20, an optical basket 190 is included as part of the optical subsystem and includes a truncated frustoconical structure having an array of plural facets 192 about the internal periphery thereof in what will be referred to herein as a substantially continuous, generally circular or annular array. Facets 192 are coated with a mirror-element 194, thus together forming an array of plural reflecting elements in the optical basket. Mounting pins (not shown) are provided to properly align optical basket 192 in an optical basket mounting structure, shown generally at 198. Optical basket mount 198 includes pin receptacles (not shown) for receiving the mounting pins, a mounting flange 202 for receiving the periphery of the optical basket therein, and clips (not shown) for holding basket 190 in place.

In the preferred embodiment, basket 190 has a diameter at its wide end of approximately 4.6 cm (1.8 in). This greatly contributes to the compactness of scanner 20. It is possible to provide, for a specific application, a scanner having basket diameters of up to about 7.7 cm (3 in), with a corresponding decrease in functional density, however, the preferred range is between about 3.8 cm (1.5 in) and 5.1 cm (2 in).

Scanner Motor and Circuit

A scanner motor 210 is provided to drive a scanning or rotatable mirror 212, which preferably is received on the end of a motor shaft 214. Surprisingly, it has been determined that motor 210 preferably is of a relatively compact "cup" style, by which generally is meant motor 210 preferably is a DC brushed motor, rather than being of the brushless style. Motor 210 is carried on a motor mount 216 which is secured to chassis 162 by a single screw, and is held in place by protrusions 218, which extend upwardly from the base of chassis 162. When optical subsystem 160 is assembled, scanning mirror 212 is centrally located within optical basket 190.

Use of DC brushed motor 210 in scanner 20 realizes many advantages over prior art scanners. First, it is much more efficient, and thus produces much less heat. Second, it requires simpler motor drive control and monitoring circuitry, thus further enabling a compact scanner. In accordance with the preferred embodiment, the contact points of the brushes (not shown) of DC brushed motor 210, which is otherwise of conventional design, are of gold (Au), although it is believed that they may be made of one or more precious metals that tend to have a long life, high corrosion-resistance and not subject to frictional particulate wear and/or electro-erosion. The motor used in the preferred embodiment operates on five volt DC power and spins nominally at 5500 rpm. While the motor control circuit used in the preferred embodiment of the invention is conventional for the most part, the motor spin monitoring circuit deserves special mention.

Figure 9:
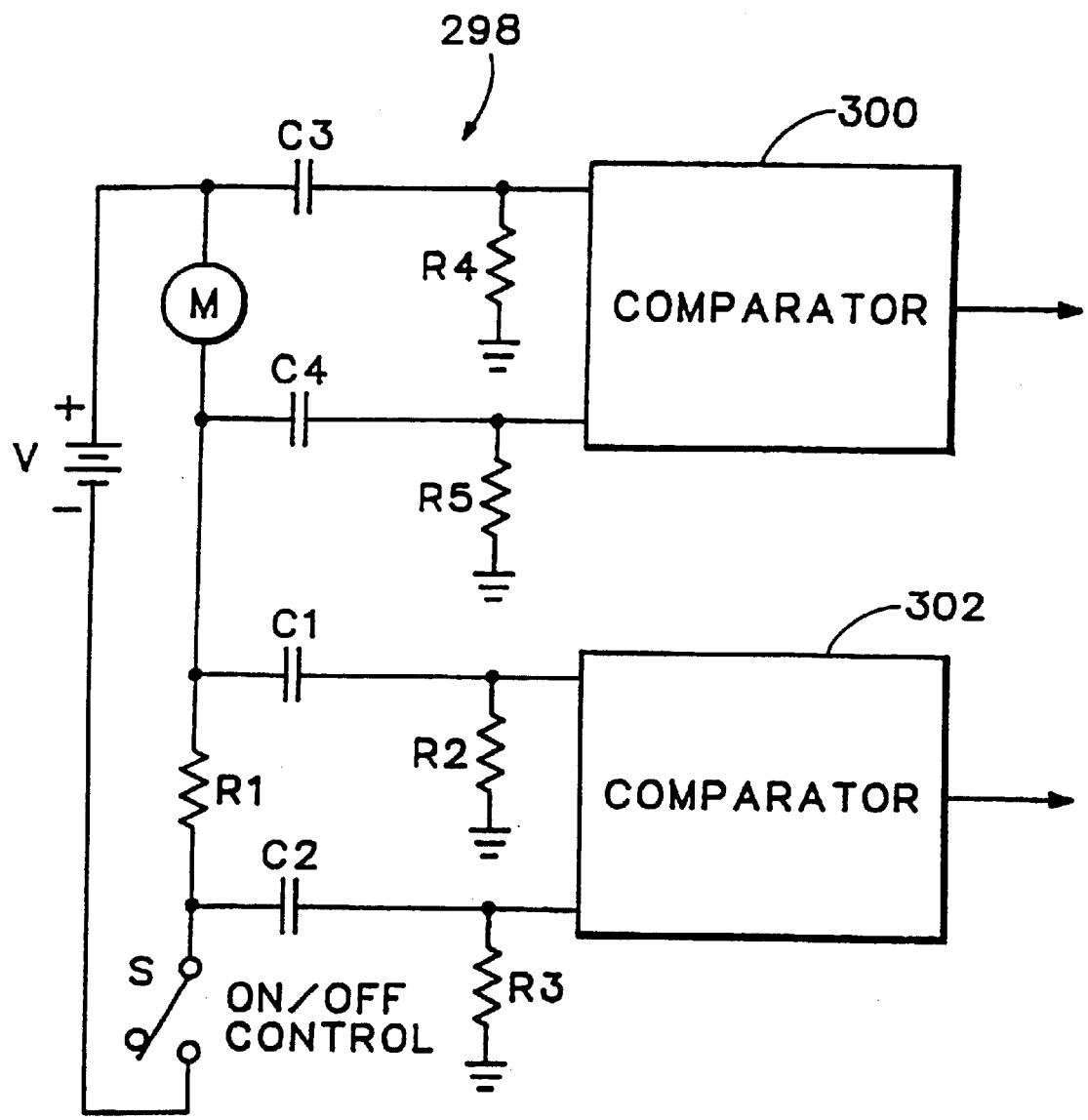
FIG. 9 is a schematic circuit diagram of the spin motor monitoring circuit that forms part of the electronics of the scanner.

Turning for a moment to FIG. 9, which is a simplified schematic block diagram illustrating how a controller circuit 298, also referred to herein as a motor spin-monitoring circuit, operates. In connection with a DC voltage V selectively impressible via a switch S thereacross, the preferred motor spin monitoring circuit may be seen to include a motor winding sense resistor R1 which develops a voltage thereacross that is proportional to the instantaneous current in the winding of a spin, or scanner, motor M, first and second, corresponding, DC-decoupling capacitors C1, C2 series connected as shown between either side of resistor R1 and the inputs of a first voltage comparator 302. Grounding resistors R2, R3 are provided for reference purposes. Resistors R1, R2, R3, capacitors C1, C2 and comparator 302 may be seen to form a current sensor that is connected with the drive terminals of motor M for producing a signal that is proportional to a defined characteristic, e.g. frequency, of the current through the excitation winding thereof.

Importantly, the voltage input to comparator 302 is only differentially compared, as between the high and low sides of current sense resistor R1, rather than being compared with an absolute DC voltage reference level. This renders the spin-monitoring circuit much simpler and less dependent upon the absolute current characteristics and other conditions of the winding of motor M, which tend to vary over time. Thus, comparator 302 acts as a zero-crossing detector to produce an output pulse sequence signal representative of a current condition of motor M e.g. its frequency, which is indicative of whether motor M is spinning. A microprocessor, e.g. the one that is a part of decoder 42, may monitor the output signal produced by comparator 302 and, if the frequency of the measured pulse sequence therein falls below a predefined threshold frequency, then the laser beam may be turned off (followed by the turning off the drive signal to motor M).

A defined output signal characteristic of comparator 302 thus represents the condition of whether motor M is spinning in accordance with a first motor winding characteristic, e.g. current, and a corresponding, predefined criterion, e.g. frequency. It will be appreciated that any suitable current characteristic may, in accordance with the invention, be compared with any predefined criteria to determine whether motor M more probably is spinning or has stopped.

For redundancy, the voltage across the same winding of motor M also is monitored by a second voltage comparator 300 (which of course may be part of the same comparator as is used to monitor current conditions), with the winding voltage similarly DC decoupled by the provision therewith of corresponding, series-connected capacitors C3, C4 and similarly grounded through grounding resistors R4, R5. Resistors R4, R5 and capacitors C3, C4 may be seen to form a voltage sensor connected with the drive terminals of motor M for producing a signal proportional to the back EMF across the excitation winding thereof. An output pulse sequence signal from comparator 300, which similarly is reference level-independent in accordance with the discussion above regarding current characteristic monitoring, thus represents the condition of whether motor M is spinning in accordance with a second motor winding characteristic, e.g. voltage, and a second defined criterion, e.g. frequency. The pulsed output of comparator 300 similarly may be monitored by a microprocessor to determine whether it remains above a predefined threshold frequency, and if it is determined that the measured frequency is below the threshold frequency then motor M may be stopped (and the laser beam turned off).

So long as both output signals of comparators 300, 302 meet predefined criteria, it is assumed that motor M is spinning. But if either output fails to so meet the criteria, then such is treated as an indication that motor M has stopped spinning, for whatever reason, which in rotating mirror-type laser systems would result in a fixed coherent beam of light of relatively high energy that might exceed allowable regulatory limits. In such case, and importantly now with redundancy that avoids prior art failures to detect such a stilled or stopped spin motor, the laser beam is inactivated, or turned off, to avoid such a condition. Thereafter, the drive to the scanning mirror motor may be turned off. Those skilled in the art will appreciate that the reverse sequence would be better used in restarting a laser scanner, i.e. the motor would first be turned on and, when the motor is up to speed, the laser beam would be activated.

The above described motor spin monitor, or motor spin-monitoring circuit, may be seen to avoid exceeding allowable regulatory limits that might result from a condition in which the non-rotation of rotating mirror 212 will produce no scanning, but instead will produce a fixed, non-patterned, laser spot. It will be appreciated that alternative current and voltage characteristics may be sensed, e.g. amplitude, phase, etc., and alternative criteria may be used to determine whether motor M still is spinning or has stopped, and that such are within the scope of the present invention. It also will be appreciated that there may be numerous applications for the invented motor spin-monitoring circuit in any laser system having a normally rotating mirror element which is used to produce a scanned light pattern. Thus, its application in the present printed code scanning system represents only one such application for the circuit within the broad scope of this aspect of the invention.

The Scanning Mirror

Referring again to FIGS. 3 and 4, scanning mirror 212 includes a mirror cradle 219, which has a mounting portion 220 including a receptacle 222 for motor shaft 214. A counter-balance 221 is located on mounting portion 220 to balance mirror 212. Tabs 223 are provided to properly position the mirror proper in the cradle.

Scanning mirror 212, also referred to herein as a driven or rotating or deflecting mirror, includes a flat reflective surface 224 which includes a zone one area 224a or first region, and a zone two area 224b or second region.

Mirror flatness in zone one is, in the preferred embodiment, approximately 4 fringes/cm (10 fringes/in), while mirror flatness in zone two may be relaxed slightly to approximately 12 fringes/cm (30 fringes/in). The optical flatness of the surfaces is achieved through a precise injection molding process to tolerances which are extremely small, such tolerances demanding exceptionally careful handling and processing, in order to produce mirror surfaces which result in the highly efficient scanner disclosed herein. The performance of scanner 20 is uncompromised by its ultra-compactness and relatively low cost. Mirror surface 224 is deposited on scanning mirror substrate 225, which is secured to cradle 219 by double sided adhesive tape in the preferred embodiment.

System Cooling—Scan Head

Another important feature of rotating mirror 212 is that it provides air movement within scan head 22 in order to provide some degree of cooling to the beat-producing electronic components in the scan head, including the VLD (which is conventionally heat-sinked, as shown), and the motor drive and motion detection circuitry included on two small PCBs mounted within scan head 22. In some instances, it may be desirable to add additional vanes to mirror 212 in order to provide more air movement. Of course, such must be done with proper regard to preserving the low and balanced mass of all rotating, or driven, elements. Alternately, shaft 214 of motor 210 may be extended through the other end of the motor and a fan blade assembly may be attached thereto.

An important feature of the scanner of the invention is the minimal heat transmission from tower 24 to scan head 22. It has been demonstrated that an increase of as little as 1° C., within the 45° C. to 50° C. upper operating temperature range, will result in a decrease of several thousand hours of life in the VLD. Additionally, the design of the optical aperture in accordance with the preferred embodiment, e.g. the selection, dimensioning and arrangement of the basket and associated components of the beam-path director, allows the VLD source to be driven at a lower current, which also results in a longer VLD life. The scanner is constructed to provide thermal partitioning in order to maintain acceptable temperatures within the scanner housing. Thermal partitioning will be more fully discussed later herein.

The Window

Window 90 is mounted in scan head 22 and is operable to bend the beam emanating from VLD housing 170 to direct the beam, by means of a series of beam-directing elements, towards other components of the optical subsystem. Window 90 includes a generally planar support structure 230 which has a number of components projecting rearwardly from an interior side 230a. Support structure 230 is also operable to rigidize scan head 22. The exterior side 230b of structure 230 faces outwardly from housing 58. The first components are interlocking posts 232 which cooperate with grips 234 on chassis 162 to secure and stabilize window 90 in a proper position relative to the rest of the optical subsystem. Alignment pins 236 are provided and are received in pin receivers 238 on chassis 162. Stops 240 cooperate with the flat front peripheral surface 242 of optical basket 190 to further rigidize the important positional and orientational relationships between window 90 and optical basket 190. Grips 234, arms 232 and the front surface 242 of basket 190 make up what is referred to herein as a basket stabilizing structure 243.

A first mirror mount 244 is provided on the rear surface of mirror 90 and includes a first turning, or directing, mirror 246 carried thereon. A second mirror mount 248 is fixed to window 90 and carries a mirror substrate 249 thereon. A second tuning mirror 250, having formed therein a collecting mirror 251, is formed on substrate 249. Second turning mirror 250 also includes a dispersing mirror 252, which is, in the preferred embodiment, located centrally within collecting mirror 251. Known scanning devices utilize mirror surfaces exclusively to fold or bend light beams, such as that designated 253. The mirrors in the scanner of the invention use curved mirrors, which are effective to not only bend, but also to focus, the light beams. The mirrors located on window 90 comprise what is referred to herein as beam-directing elements. The details of the formation of the first, second and third mirrors will be described in greater detail later herein.

In the preferred embodiment, collecting mirror 251 has a concave ellipsoid configuration and is operable to both turn and to focus light which strikes it. Mirror 251, also referred to herein as a convergence region, or second mirror zone 1, is constructed to a first specified optical smoothness and accuracy.

Dispersing mirror 252 has, in the preferred embodiment, a hyperboloid convex curvature and is also operable to turn light which strikes it while simultaneously causing the light to spread, or disperse. Mirror 252, also referred to herein as a divergence region, or second mirror zone 2, is constructed to a second specified optical smoothness and accuracy. The curvatures in the drawings are greatly exaggerated.

The Optical Path

Figure 10:
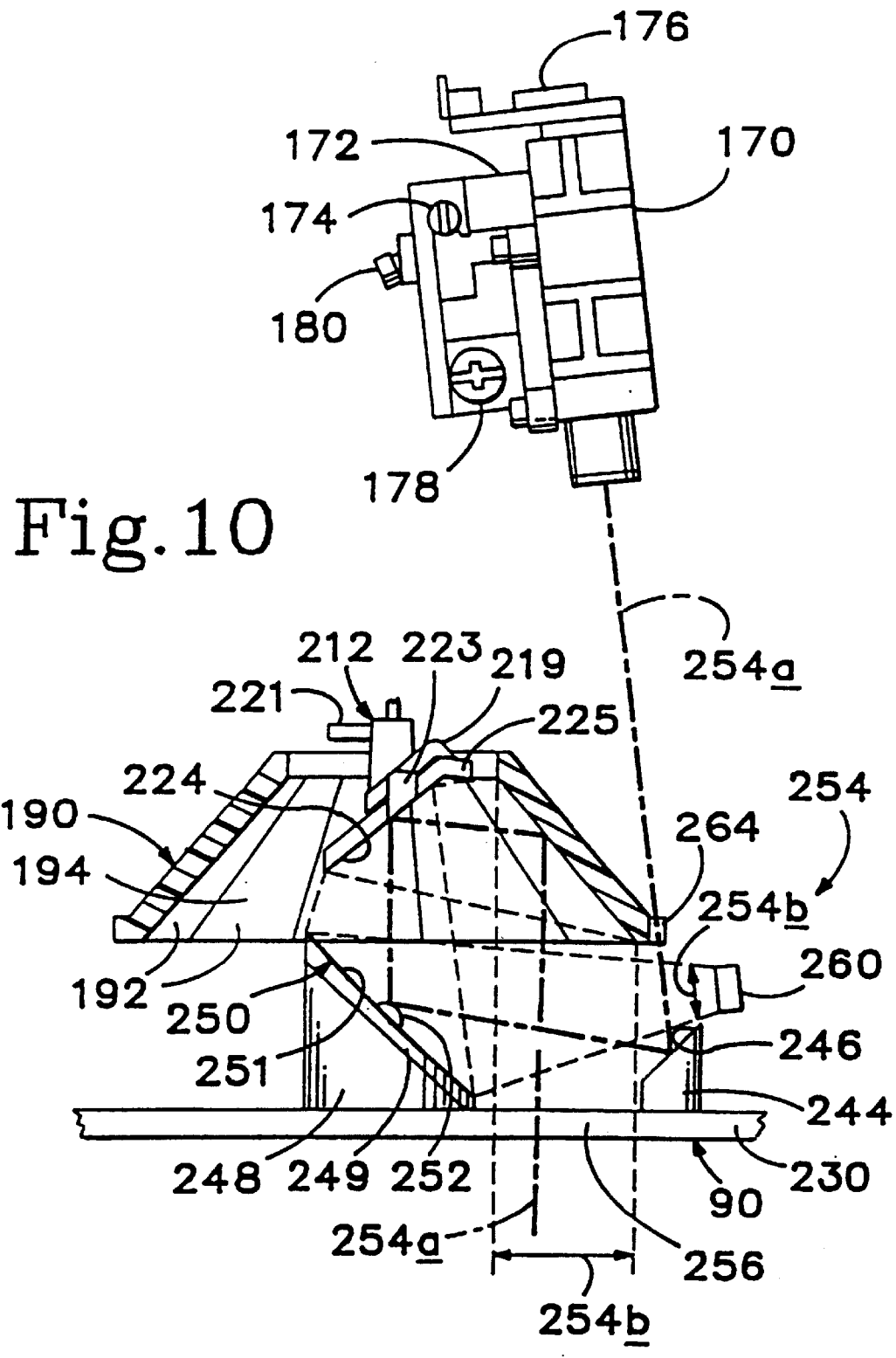
FIG. 10 is a fragmented right side elevation of the scanner housing and optical subsystem showing an optical beam path.
Figure 11:
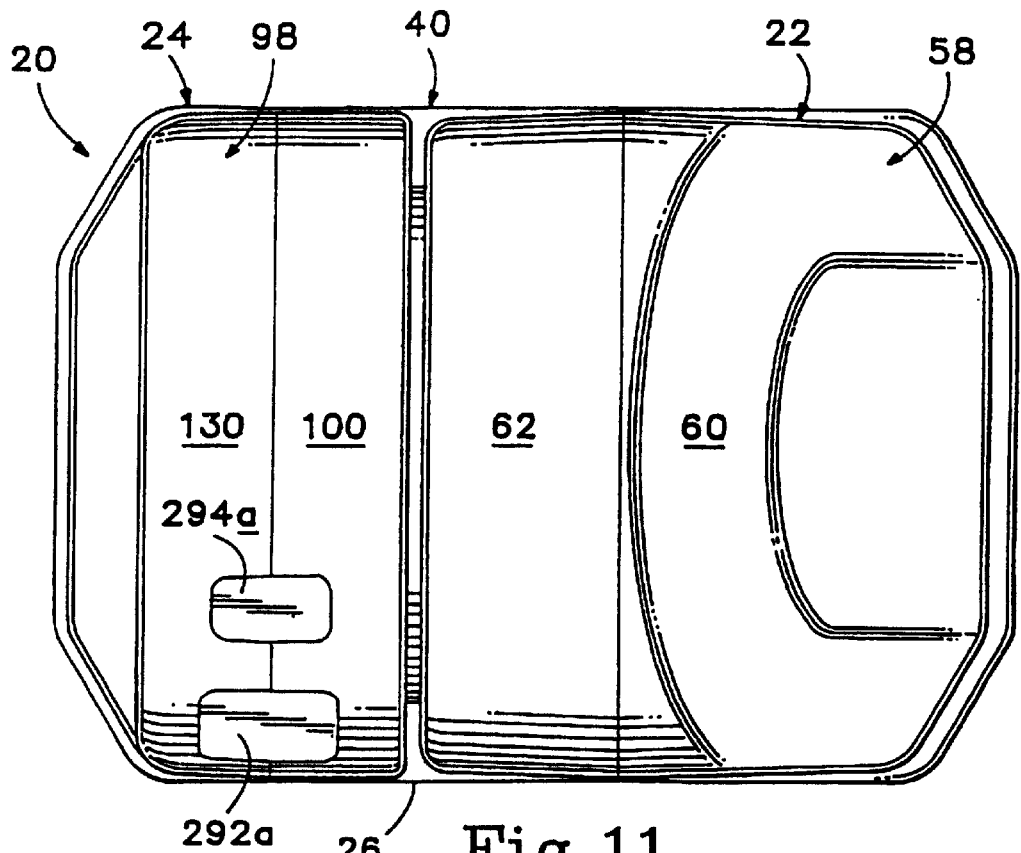
FIG. 11 is a reduced-scale top plan view of the scanner housing.
Figure 12:
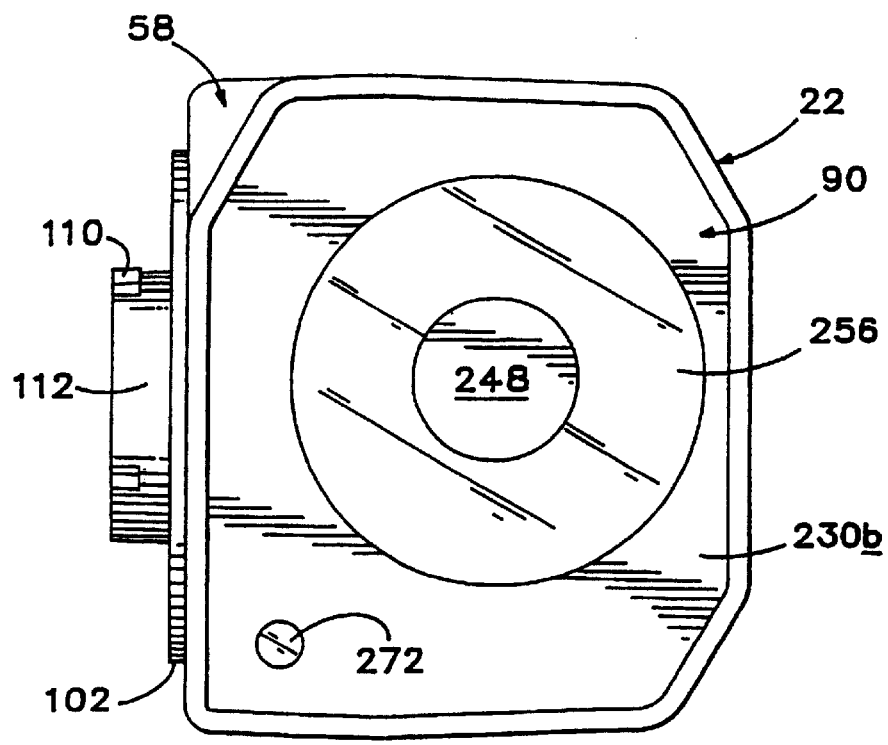
FIG. 12 is an end-on elevation of a window of the scanner housing, taken generally along the lines 12—12 of FIG. 4.

Referring now to FIG. 10, an optical path is depicted generally at 254 and includes a transmitted light beam path 254a (dash-dot line) which emanates from VLD housing 170, is directed towards first mirror 246, and impinges on dispersing mirror 252 and scanning mirror 212. As scanning mirror 212 rotates, the beam is directed towards the facets 192 of optical basket 190, and is directed out through a transparent portion, or first region, 256 of window 90 where it forms what is referred to as an asterisk light pattern when it strikes an object to be scanned (refer briefly to FIG. 1).

Return scattered, or what is referred to loosely herein as reflected, light, in the form of a reflected light beam path 254b (dashed line), returns from a bar code within the field of view of scanner 20 to scan head 22 through transparent window portion 256. There it is reflected from facets 192 of basket 190 onto scanning mirror 212 and thence onto second mirror 250, where it is directed to an optical detector 260 through a filter 262 on PCB 184. Filter 262 may be an interference filter, which may be formed of coated Mylar, and which allows light in a bandpass nominally centered on the wavelength of the VLD selectively to pass therethrough. The signal from optical detector 260 is then processed by a pre-amp carried on PCB 184. The mirror components of scanner 20 are referred to collectively herein as a beam-path director 258.

A feature of basket 190 is the inclusion of a gap, or notch, 264 in one side thereof, which provides a passage for beam path 254a through a side of the basket. Gap 264 allows further compaction of the components of scanner 20.

Returning to the mirrors which are provided in optical subsystem 160, and with reference to FIGS. 3, 4 and 10, it should be appreciated that, in order to maintain a structure in scan head 22 having as low a mass as possible, the optical elements thereof are formed, as much as practical, of plastic or polymer material. This includes the mirrors which are used in the optical subsystem. With the exception of directing mirror 246, which in the preferred embodiment is formed of conventional reflective material deposited on glass, the remaining collecting mirror 251, dispersing mirror 252, scanning mirror 212 and mirrors 194 in optical basket 190 are all formed by vacuum-depositing reflective, optical coating material on a plastic substrate. This enables the substrates, such as basket 190, scanning mirror 212 and substrate 249 for mirrors 251 and 252 to be injection molded, thereby forming light, durable, low cost and optically smooth and accurate structures that may serve as a substrate for the reflective material. In the preferred embodiment, mirrors 246 and 250 are attached to their respective mounts/substrates with double-sided adhesive tape.

With respect to second turning mirror 250, the mirror surface of collecting mirror 251 is constructed to a tolerance, or optical smoothness and accuracy, of $\leq 12$ fringes/cm ($\leq 30$ fringes/in) off of a perfect ellipsoid curve. Dispersing mirror 252 is constructed to a tolerance, or optical smoothness or accuracy, of $\leq 4$ fringes/cm ($\leq 10$ fringes/in) off of a perfect hyperboloid curve. Each of mirrors 251 and 252 have an axis of reflection, 251A and 252A in FIG. 10, respectively, which axes are angled relative to one another. In the preferred embodiment, this angle is 12°. Ideally, there would be no difference in the axes of reflection, but such construction would place the light from VLD 169 on the same path as the light going to detector 270, which is not practical for this device. The mirrors are therefore angled to compensate for the differing location of the VLD and detector.

As optical basket 190, in the preferred embodiment, has eleven facets, the asterisk pattern has eleven lines therein, which intersect at a focal point generally in the center thereof at a predefined distance from the scan head.

In the preferred embodiment, optical basket 190 is formed such that facets 192 have an angle of 52.15°, indicated as angle A, from a plane defined by the front surface 242 of the basket. Motor 210 is mounted such that shaft 214 is perpendicular to the front surface of the basket, while the flat mirror surface 224 of scanning mirror 212 is formed with an angle of 50° relative to an axis defined by shaft 214, as indicated by angle B. Angles A and B are empirically selected based on the overall size of basket 190 and the desired number of scan lines which the scanner is to generate. Put another way, the surface area of each facet is the optically limiting aperture of the device. It is desirable to have non-parallel lines in the scan pattern. For this reason, an odd number of lines should be generated. A goal of providing an optical basket with an overall diameter of two inches or less was selected which, given the sensitivity of optical sensor 260, dictated that eleven scan lines, and therefore eleven facets, will provide the requisite scan pattern having sufficient scattered light intensity to activate the optical sensor. It should be appreciated that fewer facets may be provided, as may more facets. For instance, a basket having as many as 15 facets may be provided, as may a basket having as few as 7 facets. There is, of course, a tradeoff between the number of facets, the size of facets with respect to height and width thereof, and the sensitivity of the optical detector which is used to provide the electronic signal representative of the code being scanned. The basket is one the most significant determining factors in the compactness of the scanner, so these tradeoffs are made, in the preferred embodiment, in what is believed to provide an optimal optical system.

The diameter of basket 190 is determined by minimum scan line length needed at the free end of bezel 64, along with the locations of the basket and motor. The scattered or reflected light also has an impact on the basket diameter and height of each facet. Although all of the facets in the preferred embodiment have equal angles with respect to the basket front face 242, it is also feasible to design a basket having off-set angles, which will result in a slightly different scan pattern.

It should be appreciated by those of ordinary skill in the art that it is the width of the basket facet which determines the length of an individual scan line. It is the overall area of a basket facet 194 and scanning mirror 212 which determines how much scattered light will ultimately be collected by mirror 251 and directed towards optical detector 270.

As previously noted, motor 210 and motor-mount 216 are fixed to chassis 162 with a single screw, and scanning mirror 212 is carried on motor shaft 214. Given the selected angles between the reflective surfaces in optical basket 190 and mirror surface 224, a tolerance is provided to the extent that mirror surface 224 is essentially decoupled from, so as to be outside of, the optical alignment path. This means that the motor, with its attached mirror, may be removed and replaced while the scanner is in the field, and the alignment provided by motor mount 216 and protrusions 218 is sufficient to align motor 210 and mirror surface 224 in order quickly and easily to restore the scanner to operation. Additionally, VLD housing 170 and mount 172 are easily removable and replaceable in the field. Motor mount 216 and VLD mount 172 make up what is referred to herein as an alignment mechanism which provides for selected, removable component (VLD light source housing 170 and motor 210) coupling and decoupling. This is an important advantage from both an assembly and field maintenance point of view, as the critical elements of the optical subsystem easily can be replaced without special calibration or alignment tools.

Motion Sensor

Another feature of the scanner of the invention is the presence of a proximity or motion sensor 270 which is carried on PCB 184, and which detects the presence of an object in the vicinity of the scanner as a change in the amount of light impacting thereon through an object sensor port 272 in window 90. Briefly, the provision of object sensor 270 allows the electronic components of scanner 20, specifically motor 210 and the VLD light source, to be shut down if there is no successful read for a predetermined period, which, in the preferred embodiment, is generally user adjusted to five minutes, and yet to be quickly re-activated by movement near the scanner which results in a change in ambient light.

Movement of an object in front of window 90 provides a "wake-up", or start, signal to the electronics to activate the system and scan the object. Sensor 270, in the preferred embodiment, is sensitive to changes in ambient light, and specifically, is a shadow sensor, or detector, 271 which is sensitive to reductions in light. Put another way, sensor 270, which includes shadow sensor 271 and circuitry required to generate the start signal, is shadow activated. If there has been no successful read for a five minute period, and there are no changes in ambient light, a timing circuit (not shown) will time-out and shut down power-consuming and heat-producing components such as VLD 169 and motor 210, in that order. As soon as there is a reduction in the average amount of light entering sensor 270, the scanner will wake up, first starting motor 210 and then activating VLD 169. This scenario is used to wake up the scanner as a sales associate approaches the scanner, which will generally result in the casting of shadows in the vicinity of the scanner, which in turn will generate the wake up signal.

It has been discovered that, by the use of a cadmium sulfide (CdS)-type sensor 271 positioned as illustrated, scanner 20 can be activated to read printed code generally on a first pass. This fast "wake-up" is the result of using a cup motor 210 which has a fast start-up time.

Figure 13:
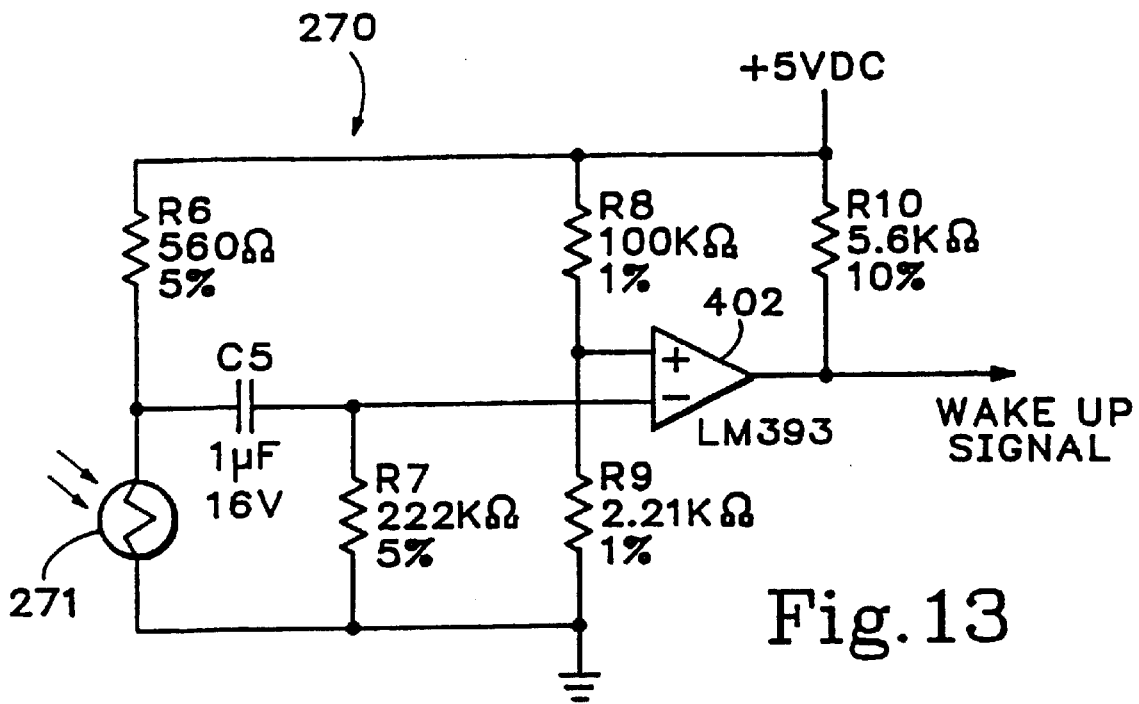
FIG. 13 is a schematic circuit diagram of the shadow detector feature of the preferred embodiment of the invention.

FIG. 13 schematically illustrates in some detail motion detector 270, also referred to herein as a "wake-up" circuit. Motion detector 270 includes a preferably cadmium sulfide (CdS) photo-sensitive resistor 271, to detect the level of ambient light reaching scanner 20. Photo-sensitive resistor, or photoresistor, 271 is located on PCB 184 mounted within scan head 22, and is responsive to light entering scanner 20 through port 272 in window 90. Numerous advantages flow from the use of a CdS photoresistor, including a low associated components count that greatly simplifies the detection circuitry; relatively slow frequency response that avoids false-positive responses to 120-Hz noise without resort to filtering; and a spectral response more like that of the human eye than previously known, silicon-based photo-sensitive diodes and resistors having lower sensitivity in certain lighting conditions.

A brief description of the operation of the circuit illustrated in FIG. 13 follows, and further explains how the advantages listed above are realized. The resistance of photoresistor 271 varies in inverse proportion of the light falling thereon, and it and a +5 VDC-connected bias resistor R6 form a voltage divider the AC output only (via a DC blocking, seriesconnected capacitor C5 and a grounded, DC referencing resistor R7) of which is connected to the negative input of an operational amplifier (OP AMP) 402. The positive terminal of OP AMP 402 is biased to a relatively low reference or threshold DC voltage level by resistors R8, R9 this reference level determining the level of change in resistance of photo-resistor 271 that is needed to trigger a WAKE-UP signal. OP AMP 402 acts as a voltage comparator, the output of which is a negative-going, 100-msec pulse signal that is treated by the microprocessor as a WAKE-UP command. A pull-up resistor R10 biases the output of OP AMP 402 to a logic one level that is compatible with the microprocessor.

Those of skill in the art will appreciate that the sensitivity of motion detector 270 to decreases in ambient light reaching photoresistor 271 may be established by choosing appropriate reference voltage and bias resistors R6, R7, R8, R9. Accordingly, while a preferred setting is illustrated, it will be understood to be within the scope of the invention to modify the circuit topology, components and component values to produce a motion detector having any desired sensitivity, frequency and spectral response. The circuit topology and component values shown in FIG. 13 have been found to produce a responsiveness to decreases in ambient light in the vicinity of scanner 20 that obviates multiple passes of a coded object, for example, within the field of view of the scanner, by responding true-positively and quickly to such decreases by turning on scanner 20 and reading a printed code on the object the "shadow" of which was detected by motion detector 270.

The Digital Module

Referring again to FIGS. 2, 4 and 5, a digital processing subsystem 278 having two PCBs, identified by the reference numerals 280 and 282, are located in tower 24. PCB 280 contains a power conversion/distribution mechanism 46, and is connected to connector 142 and thence to cable 48. PCB 282 carries decoder 42 and communications means, or a communication interface, 44 thereon. It will be appreciated that decoder 42 and interface 44 may be of conventional design, but preferably are rendered in very large-scale integrated (VLSI) circuits, most preferably surface mount devices, further to increase the functional density of scanner 20.

As depicted in FIG. 2, the scan pattern generator 28 includes the VLD light source module 169 contained in VLD housing 170, the drive for the VLD, contained on PCB 176, first mirror 246, second mirror 250, rotating mirror 212, window 90, and object sensor 270. Additionally, a motor control circuit, or motor controller, for motor 210 is carried on PCB 176. Optical, or object, sensor 270 is also mounted on the PCB.

The collection optics 30 include window 90, optical basket 190, rotating mirror 212, and collecting mirror 251.

Detector 260 and a pre-amp, collectively designated as block 32 in FIG. 2, are both carried on PCB 280, as is the signal processing unit 34. Wiring harness 38 is operable to connect to PCB 184 by means of plug 284 carried on the PCB, and connector 38a, which is part of the wiring harness. The harness exits scan head 22 through a port 286 in rotational mechanism 40, and connects by means of a connector 38b to a plug 288 on PCB 282. PCB's 280 and 282 are interconnected by a mating plug arrangement 290.

In the event that it is necessary to replace detector 260, the detector easily may be replaced in the field along with PCB 280. As in the case of scanning mirror 212, although detector 260 is the ultimate destination of the optical path, the arrangement of chassis 162 and the other components of the scanner are such that replacement of PCB 280 with detector 260 thereon will permit very good optical alignment, thereby maintaining the system operational.

Referring momentarily to FIGS. 1 and 5, an OFF/ON switch 292 is located on PCB 280, and is activated by a push button 292a which is mounted on tower 24. A power-on, light emitting diode (LED) indicator 294 also is located on PCB 280, and an associated viewing window 294a is carried on the tower. Scanner 20 is connected to cable 48 and its associated connector 142 by means of a plug 296, which is also carried on PCB 280.

Thermal Partitioning

Figure 14:
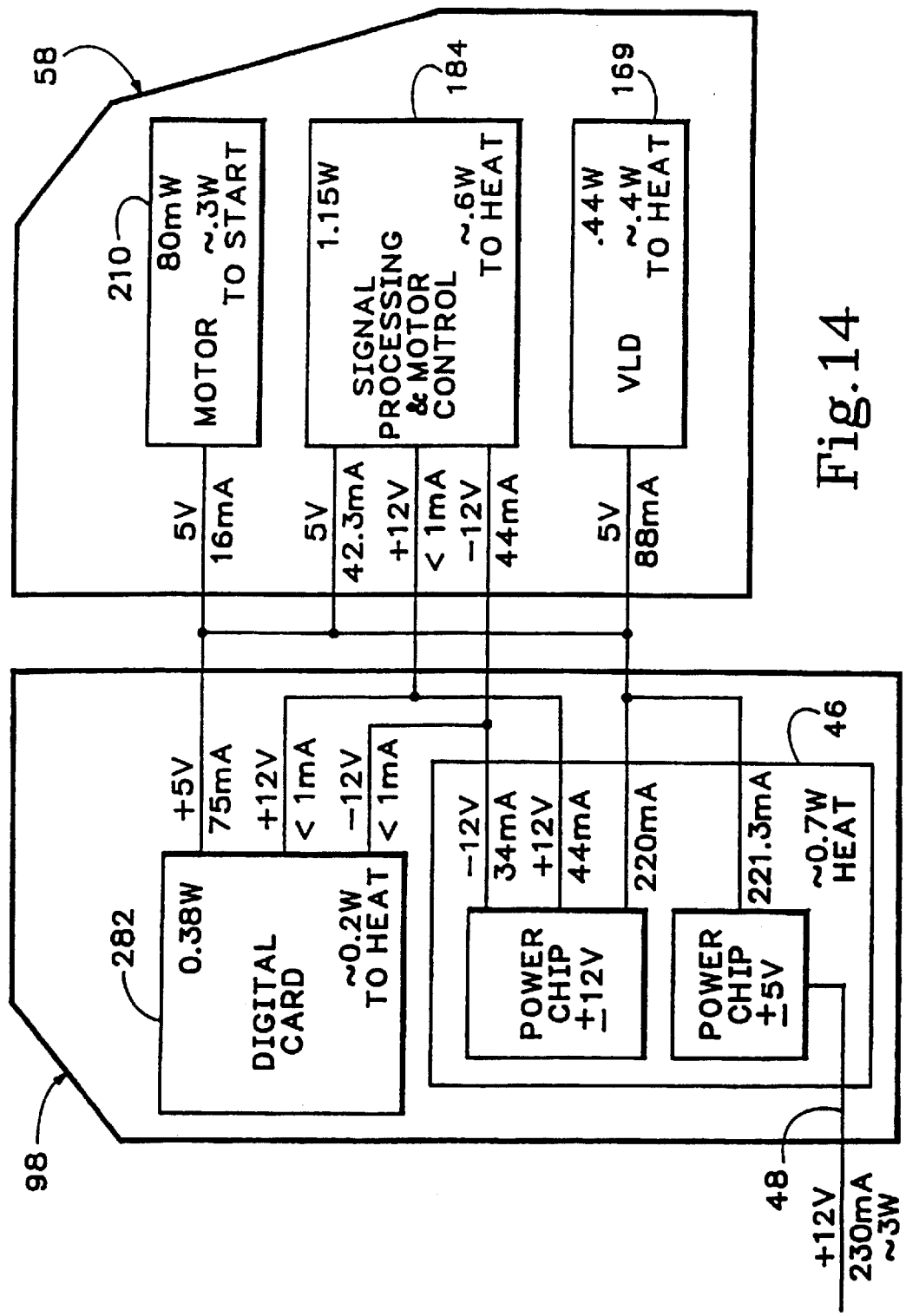
FIG. 14 is a schematic block diagram of the scanner circuitry depicting thermal separations characteristics of the scanner.

Turning finally to FIGS. 2 and 14, it may be seen that thermal partitioning of the circuitry and components of scanner 20 has been optimized to increase the scanner's performance. FIG. 14 illustrates in schematic/tabular form the thermal partitioning of the preferred embodiment of the invention that results in approximately equal heat production from components contained within first and second housing portions, or scan head housing 58 and tower housing 98. Those of skill in the art will appreciate from a brief review of FIG. 14 that, because power supply 46 and digital circuitry (including decoder 42 and the communications means) mounted on PCBs 280, 282 are located within tower housing 98, it is estimated that in the preferred embodiment the heat produced within the tower housing does not exceed approximately 0.9 watt. It also will be appreciated that, because VLD 169, motor control, detector 260, signal processing 34 and motion sensor 270 circuitry are located within scan head housing 58, it is estimated that in the preferred embodiment the heat produced within the scan head housing does not exceed approximately 1 watt during steady state operation, i.e., after startup of motor 210, during which there briefly is up to an additional 3 watts of heat produced. It is believed that optical subsystem 160 operates accurately and reliably at such a level of heat within housing 21. Although superior operation is achieved in the preferred embodiment by not exceeding the 1 watt heat production goal, it is believed that the optical subsystem may operate effectively with heat production range of 1.1 watts to 1.3 watts, or more.

This substantially equal partitioning of the heat-producing components of scanner between scan head 22 and the tower 24 render scanner 20 cool and accurate in extended operation, without the need for anything but convection cooling, as described herein. Thus, it will be appreciated that the preferred embodiment of the invention is believed optimally to have partitioned the electronic and optical components of the scanner in consideration of a number of factors, including the desirable separation of heat-producing from heat-sensitive components, the desirable approximately equal distribution of thermal density between the relatively rotatable scanner housing portions, and the desirable optimization of functional density of all components. It will be appreciated that this last goal of functional density is to some extent inconsistent with thermal separation and partitioning, and that scanner 20 in its preferred embodiment described herein is believed optimally to have traded off the various factors in achieving unprecedented performance in an ultra-compact printed code scanner.

The apparatus of the invention is now understood to provide a number of advantages over prior art code scanners, as well as important advantages in scanning mirror motor drive design. The herein described, ultra-compact scanner provides extreme versatility in positioning, orientation and mounting by its relatively rotatable, bifurcated housing portioning. It also provides unprecedented performance, in terms of code-reading accuracy and reliability because of the thermal partitioning of its optical and electrical components and its use of high-efficiency components that produce relatively little heat. In its modified embodiments, the scanner provides all of these advantages and the additional advantage that all such optical and electrical components may be contained within a singular housing suitable for hand held operation. In all disclosed embodiments, size, mass and heat are reduced, as well as manufacture, calibration and field maintenance costs minimized.

Accordingly, while preferred and alternative embodiments of the invention have been described herein, it is appreciated that further variations and modifications will become apparent to those skilled in the art and may be made within the scope of the invention.

We claim:

1. An improved motor-spin monitoring circuit for use with a motor directing a coherent light beam source within an optical system comprising:

a motor-spin monitor capable of starting and stopping such light beam source, said monitor including a voltage sensor connected with the drive terminals of such motor for producing a first input signal proportional to the back EMF across the motor's excitation winding;

a current sensor connected with the drive terminals of such motor for producing a second input signal proportional to the current through such excitation winding; and a comparator for differentially comparing either side of said first input signal to produce an output signal representative of a predefined voltage condition in such winding, and for comparing either side of said second input signal to produce a second output signal representative of a predefined current condition in such winding;

said monitor being responsive to said first and said second output signals by stopping such light beam source upon condition that either one or both of said output signals meet(s) predefined criteria indicating that the motor has stopped spinning.

2. The circuit of claim 1, wherein said first and said second input signals are DC-decoupled by corresponding capacitors series-connected between such motor drive terminals and said comparator.

3. In an ultra-compact scanner for reading a printed code, the scanner including a scan pattern generator producing a light pattern in a field of view, the generator including a coherent light source and a scanning mirror, the improvement comprising:

a motor operatively connected with such scanning mirror to rotate it, said motor being of the DC brushed type.

4. The improvement of claim 3, wherein the contact points of the brushes of said motor are of one or more precious metals.

5. The improvement of claim 3 or 4, wherein said motor is operatively connected to a motor spin-monitoring circuit, said spin-monitoring circuit sensing defined voltage and current characteristics associated with a winding of said motor, and ceasing production of such light pattern field of view upon detection of a predefined condition of at least one of said defined voltage and current characteristics.

6. In an ultra-compact scanner for reading a code, an opto-mechanical subsystem comprising:

a light source for emitting a coherent light beam of a predetermined wavelength;

an optical detector for detecting light of said predetermined wavelength;

a beam-path director for directing said light beam in a desired beam path, said beam-path director including a window having, integrally formed thereon, beam directing elements.

7. The subsystem of claim 6, wherein said window includes a first region which is substantially transparent to light of said predetermined wavelength for allowing bidirectional light transmission and for supporting a collection of mirror elements thereon, said window having an exterior side and an interior side, said interior side having a first mirror mount for supporting a directing mirror element and a second mirror mount for supporting a collecting mirror thereon, wherein said collecting mirror supports a dispersing mirror thereon.

8. The subsystem of claim 7, wherein said beam-path director further includes a driven rotating mirror which is toroidally surrounded by an optical basket having therein an array of plural reflecting elements.

9. The subsystem of claim 8, wherein said driven mirror includes a first driven mirror region and a second driven mirror region having different optical characteristics.

10. The subsystem of claim 9, wherein said first and second driven mirror regions are co-planar.

11. The subsystem of claim 10, wherein said first driven mirror region has an optical flatness of about 4 fringes/cm (10 fringes/in) and said second driven mirror region has an optical flatness of about 12 fringes/cm (30 fringes/in).

12. The subsystem of claim 8, wherein said beam path includes a transmitted beam path in which said light beam begins at said light source, is reflected at said directing mirror element towards said dispersing mirror which directs said beam to said rotating mirror, thence to said array of plural reflecting elements, and through said window first region towards code being scanned; and wherein said beam path further includes a collected beam path in which a portion of the light scattered from such code being scanned passes through said transparent portion to said array, thence to said rotating mirror, to said collecting mirror and thereafter to said optical detector.

13. The subsystem of claim 6, wherein said second mirror mount is located in said first region.

14. The subsystem of claim 6, wherein said collecting mirror has an ellipsoid concave curvature and said dispersing mirror has a hyperboloid convex curvature.

15. The subsystem of claim 6, wherein said collecting mirror, said dispersing mirror, said scanning mirror and said reflective elements on said basket are formed with a polymer substrate having a reflective surface deposited thereon.

16. The subsystem of claim 6 which includes a chassis for supporting the components of the subsystem, said chassis having a basket mounting structure and a basket-stabilizing structure thereon to maintain a predetermined distance and orientation between said basket and said window.

17. The subsystem of claim 16, wherein said basket-stabilizing structure includes grips thereon, and said window includes interlocking posts projecting from the interior surface thereof, said posts having conformal receptacles therein for receiving said grips.

18. The improvement of claim 3, wherein the contact points of said motor comprise gold.

19. The improvement of claim 3 further comprising a motor-spin monitor capable of starting and stopping said light source, said monitor including a voltage sensor connected with drive terminals of said motor for producing a first input signal proportional to the back EMF across excitation winding of said motor;

a current sensor connected with the drive terminals of said motor for producing a second input signal proportional to current through the excitation winding; and a comparator for differentially comparing either side of said first input signal to produce an output signal representative of a predefined voltage condition in the excitation winding, and for comparing either side of said second input signal to produce a second output signal representative of a predefined current condition in the excitation winding;

said monitor being responsive to said first and said second output signals by stopping said light source upon condition that either one or both of said output signals meet predefined criteria.

* * * * *

UNITED STATES PATENT AND TRADEMARK OFFICE
CERTIFICATE OF CORRECTION

PATENT NO. : 6,460,768 B2
DATED : October 8, 2002
INVENTOR(S) : James W. Ring et al.

It is certified that error appears in the above-identified patent and that said Letters Patent is hereby corrected as shown below:

Column 5,
Lines 7-8, "printed bar" should read -- "printed bar --.

Column 6,
Line 66, "limiting" should read -- Limiting --.

Column 8,
Line 55, "F or" should read -- For --.

Column 12,
Line 18, "beat-producing" should read -- heat-producing --.

Column 15,
Line 22, "quickly and easily to" should read -- to quickly and easily --.

Column 16,
Line 25, "seriesconnected" should read -- series-connected --.

Signed and Sealed this

Third Day of February, 2004

JON W. DUDAS
*Acting Director of the United States Patent and Trademark Office*